United States Patent
Li et al.

(10) Patent No.: US 12,093,464 B2
(45) Date of Patent: Sep. 17, 2024

(54) SYSTEMS FOR INTERPRETING A DIGIT-TO-DIGIT GESTURE BY A USER DIFFERENTLY BASED ON ROLL VALUES OF A WRIST-WEARABLE DEVICE WORN BY THE USER, AND METHODS OF USE THEREOF

(71) Applicant: Meta Platforms Technologies, LLC, Menlo Park, CA (US)

(72) Inventors: Yinglin Li, Newark, CA (US); Qian Chen, Newark, CA (US); Chengyuan Yan, San Bruno, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/900,809

(22) Filed: Aug. 31, 2022

(65) Prior Publication Data

US 2023/0076068 A1 Mar. 9, 2023

Related U.S. Application Data

(60) Provisional application No. 63/240,810, filed on Sep. 3, 2021.

(51) Int. Cl.
*G06F 3/03* (2006.01)
*A63F 13/211* (2014.01)
(Continued)

(52) U.S. Cl.
CPC ............ *G06F 3/017* (2013.01); *A63F 13/211* (2014.09); *A63F 13/212* (2014.09);
(Continued)

(58) Field of Classification Search
CPC ........ G06F 3/017; G06F 3/015; G06F 3/0346; G06F 3/038; G06F 2203/0384;
(Continued)

(56) References Cited

U.S. PATENT DOCUMENTS 9,971,492 B2    5/2018 Chandler et al.
2002/0024500 A1* 2/2002 Howard ................. G06F 3/014
                                                345/158
(Continued)

FOREIGN PATENT DOCUMENTS

EP    3660633 A1    6/2020

OTHER PUBLICATIONS

Apple, "Control Apple TV with Apple Watch," Retrieved on Mar. 12, 2021, 2 pages, Retrieved from the Internet: URL: https://support.apple.com/guide/watch/control-apple-tv-apd619078d99/watchos.
(Continued)

*Primary Examiner* — Lunyi Lao
*Assistant Examiner* — Jarurat Suteerawongsa
(74) *Attorney, Agent, or Firm* — Morgan, Lewis & Bockius LLP

(57) ABSTRACT

A method of interpreting a digit-to-digit gesture based on roll values for a wrist-wearable device is disclosed. The method includes, receiving an indication at a first point in time that a user donning the wrist-wearable device is providing a digit-to-digit gesture in which one of the user's digits touches another of the user's digits without contacting the display of the wearable device. The method further includes, in accordance with a determination that the digit-to-digit gesture is provided while data indicates that the wrist-wearable device has a first roll value, causing a target device in communication with the wearable device to perform a first input command and receiving another indication at a second point in time that is after the first point in time
(Continued)

that the user is providing the digit-to-digit gesture again, causing the target device to perform a second input command that is distinct from the first input command.

19 Claims, 20 Drawing Sheets

(51) Int. Cl.
| | | |
|---|---|---|
| *A63F 13/212* | (2014.01) | |
| *A63F 13/235* | (2014.01) | |
| *G06F 3/01* | (2006.01) | |
| *G06F 3/0346* | (2013.01) | |
| *G06F 3/038* | (2013.01) | |

(52) U.S. Cl.
CPC ............ *A63F 13/235* (2014.09); *G06F 3/015* (2013.01); *G06F 3/0346* (2013.01); *G06F 3/038* (2013.01); *A63F 2300/1012* (2013.01); *A63F 2300/1031* (2013.01); *A63F 2300/105* (2013.01); *G06F 2203/0384* (2013.01)

(58) Field of Classification Search
CPC ........ G06F 3/03; A63F 13/211; A63F 13/212; A63F 13/235; A63F 2300/1012; A63F 2300/1031; A63F 2300/105
See application file for complete search history.

(56) References Cited

U.S. PATENT DOCUMENTS

| | | | | |
|---|---|---|---|---|
| 2007/0259716 | A1* | 11/2007 | Mattice | G07F 17/32 |
| | | | | 463/36 |
| 2009/0054067 | A1 | 2/2009 | Gauthier et al. | |
| 2012/0127070 | A1* | 5/2012 | Ryoo | G06F 3/0346 |
| | | | | 345/156 |
| 2013/0317648 | A1 | 11/2013 | Assad | |
| 2014/0098018 | A1 | 4/2014 | Kim et al. | |
| 2015/0084860 | A1 | 3/2015 | Aleem et al. | |
| 2016/0036965 | A1* | 2/2016 | Kim | H04M 1/67 |
| | | | | 455/411 |
| 2017/0123487 | A1 | 5/2017 | Hazra et al. | |
| 2017/0199586 | A1 | 7/2017 | Samuel et al. | |
| 2017/0201612 | A1* | 7/2017 | Donley | H04W 8/005 |
| 2017/0308118 | A1* | 10/2017 | Ito | G06F 1/163 |
| 2018/0153430 | A1* | 6/2018 | Ang | A61B 5/24 |
| 2018/0164892 | A1 | 6/2018 | Han et al. | |
| 2020/0073483 | A1 | 3/2020 | Berenzweig et al. | |
| 2020/0097083 | A1* | 3/2020 | Mao | G06F 3/16 |
| 2021/0064132 | A1 | 3/2021 | Rubin et al. | |
| 2021/0089131 | A1 | 3/2021 | Wang et al. | |
| 2021/0117010 | A1* | 4/2021 | Rizzardini | G06F 1/1694 |
| 2021/0124417 | A1* | 4/2021 | Ma | G06F 3/015 |
| 2021/0232226 | A1* | 7/2021 | Cipoletta | H04W 4/029 |
| 2022/0371697 | A1* | 11/2022 | van Kuilenburg | B63B 27/16 |

OTHER PUBLICATIONS

Ginkage., "WearMouse: Wear OS Air Mouse," Apr. 19, 2020, 3 pages Retrieved from the Internet: URL: https://github.com/ginkage/wearmouse.

International Search Report and Written Opinion for International Application No. PCT/US2022/042612, mailed Dec. 9, 2022, 11 pages.

Manda O.R., "Miniaturization of Computer Mouse as a Wearable Device," Master of Science with a Major in Engineering, Engineering Technology, Texas State University, Dec. 2017, 113 pages.

Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.

Zhang Y., et al., "FinDroidHR: Smartwatch Gesture Input with Optical Heartrate Monitor," Proceedings of the ACM on Interactive Mobile Wearable and Ubiquitous Technologies, Mar. 2018, vol. 2 (1), 42 pages.

International Preliminary Report on Patentability for International Application No. PCT/US2022/042612, mailed Mar. 14, 2024, 7 pages.

* cited by examiner

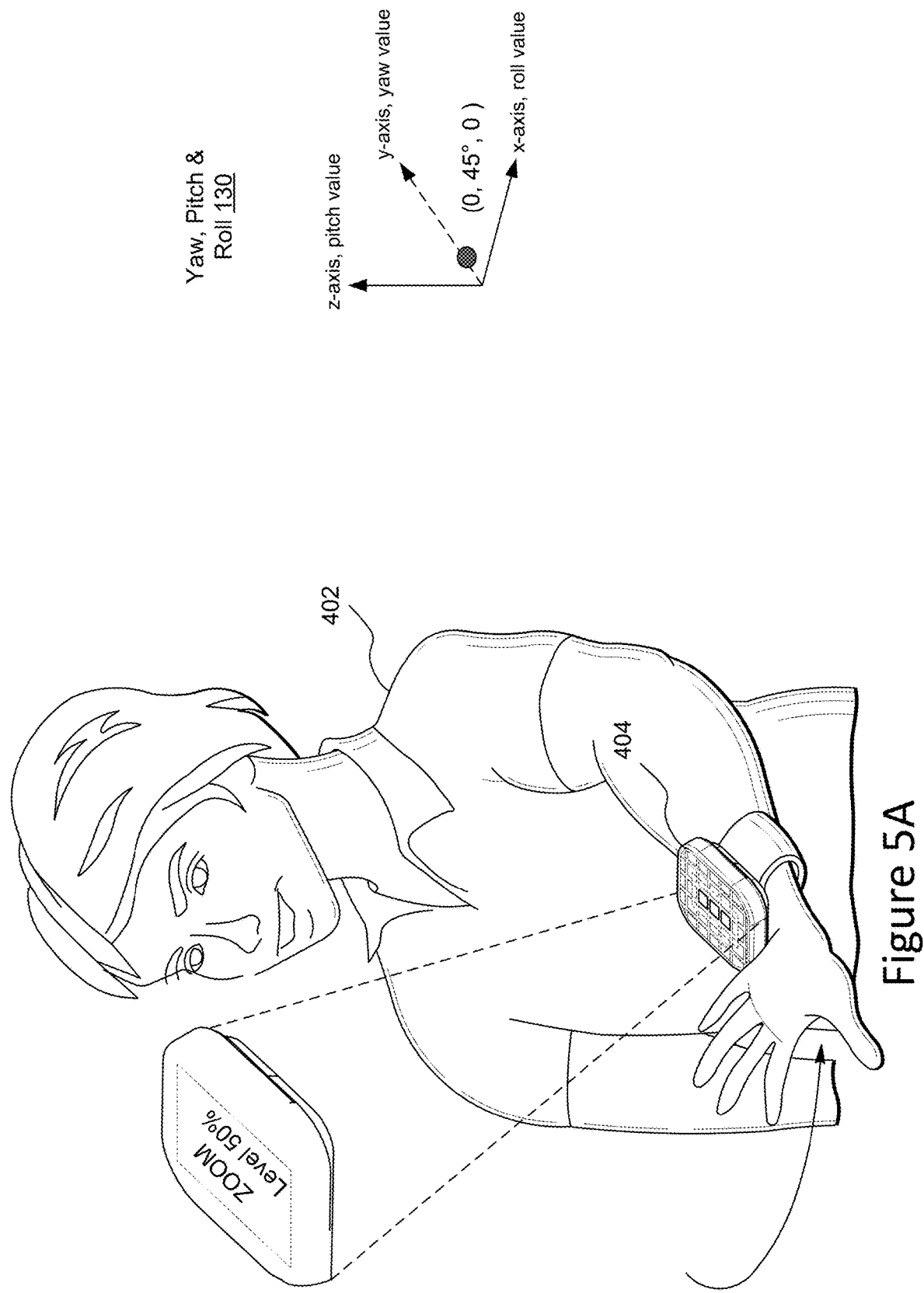

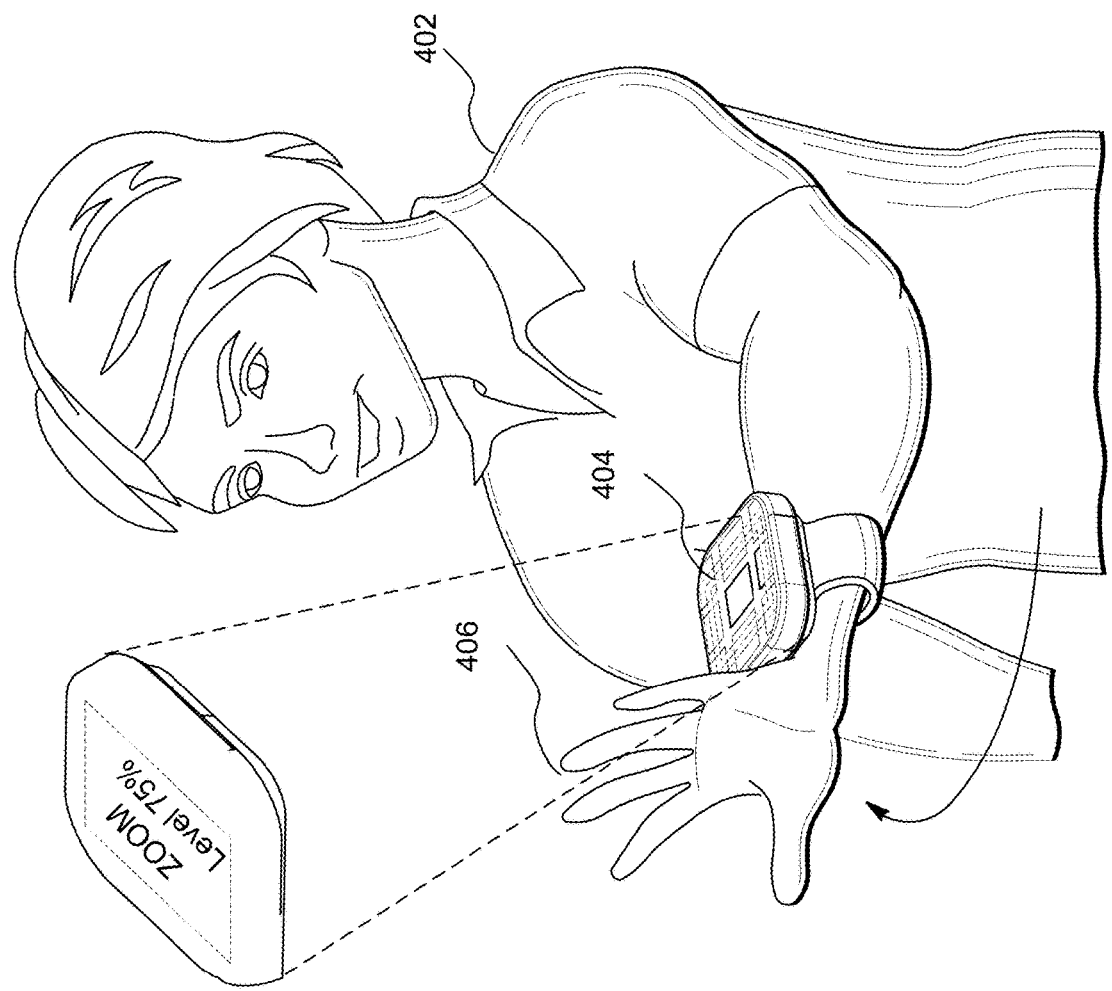
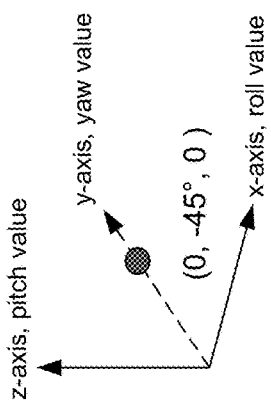
Figure 5B

600

602
Receive an indication at a first point in time that a user donning a wrist-wearable device is providing a digit-to-digit gesture in which one of the user's digits touches another of the user's digits without contacting the display of the wrist-wearable device.

604
In accordance with a determination that the digit-to-digit gesture is provided while data from the one or more sensors indicates that the wrist-wearable device has a first roll value, causing a target device that is in communication with the wrist-wearable device to perform a first input command.

606
The target device is separate and distinct from the wrist-wearable device.

608
The target device is the wrist-wearable device.

610
Receive another indication at a second point in time that is after the first point in time that the user is providing the digit-to-digit gesture again.

612
The indication received at the first point in time and the other indication received at the second point in time are both detected based on neuromuscular signals sensed by Electromyography (EMG) sensors of the one or more sensors of the wrist-wearable device.

614
The indication received at the first point in time and the other indication received at the second point in time are both detected based on vibration signals sensed by an Inertial Measurement Units (IMU)s of the one or more sensors of the wrist-wearable device.

615
In accordance with a determination that the digit-to-digit gesture is provided again while data from the one or more sensors indicates that the wrist-wearable device has a second roll value that is distinct from the first roll value, causing the target device to perform a second input command that is distinct from the first input command.

616
Each of the first input command and the second input command controls video playback at the target device.

618
Each of the first input command and the second input command controls navigation through photos displayed at the target device.

620
Each of the first input command and the second input command controls a gaming interface displayed at the target device.

622
Control a user interface on the display of the wrist-wearable device based on additional sensor data from Inertial Measurement Units (IMU)s of the one or more sensors of the wrist-wearable device.

624
Controlling the user interface on the display of the wrist-wearable device includes changing zoom levels on a map based on yaw values of the wrist-wearable device.

626
Select different input commands as the first and second input commands based on whether biometric data sensed at the wrist-wearable device indicates that the user is a first user or a second user

628
Select sensed-value thresholds that are specific to the user, the sensed-value thresholds used by the wrist-wearable device for detecting one or both of (i) the digit-to-digit gesture and (ii) the first and second roll values for different users of the wrist-wearable device.

630
The first input command is selected based on a device state of the target device.

632
The device state includes information regarding an application that is executing on the target device when the indication is received.

634
While the target device is displaying a first application, the first input command causes the target device to perform a first action; and while the target device is displaying a second application, the first input command also causes the target device to perform the first action.

636
While the target device is displaying a first application, the first input command causes the device to perform a first action; and while the target device is displaying a second application, the first input command causes the device to perform a second action distinct from the first action.

638
Prior to receiving the indication at the first point in time that the user is providing the digit-to-digit gesture, establish a communication channel with the target device, without requiring any input from the user.

640
An ultra-wideband (UWB) antenna of the wrist-wearable device is used for establishing the communication channel.

In response to detecting that the wrist-wearable device has moved closer to a second target device than to the target device:
642-a
establish a second communication channel with the second target device instead of the target device, without requiring any input from the user;
642-b
receive an additional indication at a third point in time that the user intends to perform the digit-to-digit gesture once again; and
642-c
In accordance with a determination that the gesture that is once again provided is provided while the one or more sensors indicate that the wrist-wearable device has a third roll value, cause the second target device to perform a third input command, using the second communication channel.

Figure 6D

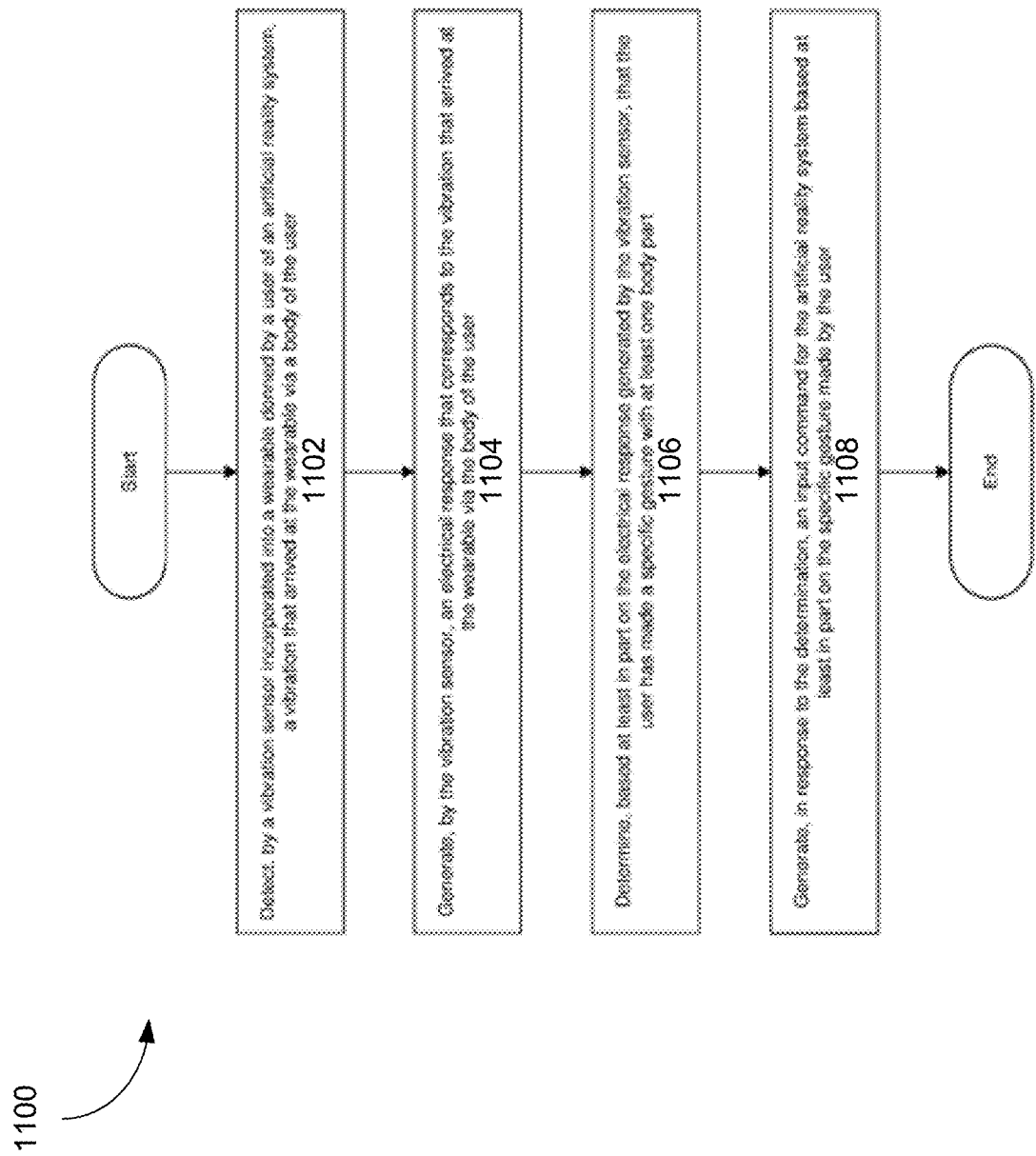

SYSTEMS FOR INTERPRETING A DIGIT-TO-DIGIT GESTURE BY A USER DIFFERENTLY BASED ON ROLL VALUES OF A WRIST-WEARABLE DEVICE WORN BY THE USER, AND METHODS OF USE THEREOF

CROSS-REFERENCE TO RELATED APPLICATIONS

This application claims priority to U.S. Provisional Patent Application Ser. No. 63/240,810, filed Sep. 3, 2021, entitled "Systems for Interpreting a Digit-to-Digit Gesture by a User Differently Based on Roll Values of a Wrist-Wearable Device Worn by the User, and Methods of Use Thereof," which is herein fully incorporated by reference in its respective entirety.

TECHNICAL FIELD

This application relates generally to interpretation of digit-to-digit gestures at a wrist-wearable device, and, more specifically, to interpreting a digit-to-digit gesture (e.g., one finger touching a thumb) by a user differently based on roll values of the wrist-wearable device (e.g., different input commands are caused to be performed at a device controlled by the wrist-wearable device if the digit-to-digit gesture is performed while the wrist-wearable device has a first roll value as compared to when the wrist-wearable device has a second roll value).

BACKGROUND

Inertial measurement units (IMU)s of consumer electronic devices are able to provide yaw, pitch, and roll values for the consumer electronic devices. These values can be used in conjunction with games on the consumer electronic devices, e.g., to allow a user to move the device around in three-dimensional space to cause different changes in direction of a race car, as one example.

Use of values from the IMU also could be used to enable a richer set of available gestures at consumer electronics devices. One underexplored area is the use of some of these values from the IMU to assist with providing richer gesture interactions and expanding the realm of available gestures. Further explorations would help to enable such richer gesture interactions and to expand the realm of available gestures. These explorations can also help to address drawbacks, including the need for users to have to look at a controlling device (e.g., a remote control or a device's display on which commands are displayed) to control some other device, rather than being able to provide intuitive and rich gesture commands without having to look at the controlling device at all, e.g., without having to look at the remote control or the device's display.

As such, there is a need for the explorations discussed above, including to develop additional gesture interpretation techniques to allow for more sophisticated and efficient controls over other devices (e.g., to allow gestures detected by a wrist-wearable device to cause performance of various commands at a different electronic device, such as a television). These explorations would also help to address the above drawbacks faced when controlling devices are used to control other devices.

SUMMARY

The systems and methods described herein address one or more of the above-mentioned drawbacks by allowing a user to provide digit-to-digit gestures detected at a wrist-wearable device while the wrist-wearable device has different roll values (e.g., roll values determined by an inertial measurement unit of the wrist-wearable device). For example, if the wrist-wearable device detects that a user is intending to perform a digit-to-digit gesture (e.g., intending to cause their index finger to contact their thumb) while the wrist-wearable device has a first roll value (e.g., display is pointing toward a ceiling), then the wrist-wearable device can cause performance of a first command (either at the wrist-wearable device itself or at a device that is being controlled by the wrist-wearable device such as a television). Continuing this example, if the wrist-wearable device detects that a user is intending to perform the same digit-to-digit gesture (e.g., intending to cause their index finger to contact their thumb) while the wrist-wearable device has a second roll value (e.g., display is pointing toward a floor instead of the ceiling), then the wrist-wearable device can cause performance of a second command that is distinct from the first command (either at the wrist-wearable device itself or at a device that is being controlled by the wrist-wearable device such as a television). Based on explorations conducted by the inventors, this example technique has been determined to provide an expanded set of gestures (e.g., the same digit-to-digit command can be interpreted as a different gesture based on roll value of the wrist-wearable device, essentially turning one digit-to-digit gesture into multiple different digit-to-digit gestures with associated roll values) and to make it seamless and efficient for users to control devices using a wrist-wearable device (e.g., a user can seamlessly provide various digit-to-digit commands to control a television without needing to look down at the wrist-wearable device to allow them to perform the gestures).

(A1) To that end, in accordance with some embodiments, a method of interpreting a digit-to-digit gesture based on roll values for a wrist-wearable device is provided. The method is performed at a wrist-wearable device including a display and one or more sensors configured to detect yaw, pitch, and roll values (e.g., angular values as discussed in more detail below) for the wearable device. The method includes receiving an indication at a first point in time that a user donning the wrist-wearable device is providing a digit-to-digit gesture in which one of the user's digits touches another of the user's digits without contacting the display of the wearable device. The method further includes, in accordance with a determination that the digit-to-digit gesture is provided while data from the one or more sensors indicates that the wrist-wearable device has a first roll value, causing a target device that is in communication with the wearable device to perform a first input command. The method further includes, receiving another indication at a second point in time that is after the first point in time that the user is providing the digit-to-digit gesture again, and in accordance with a determination that the digit-to-digit gesture is provided again while data from the one or more sensors indicates that the wearable device has a second roll value that is distinct from the first roll value, causing the target device to perform a second input command that is distinct from the first input command. One example of a wrist-wearable device is wrist-wearable device 114 that can detect digit-to-digit gestures while the device 114 has different roll values as shown in FIGS. 1A-1E. FIG. 1C in particular depicts performance of a digit-to-digit gesture by user 110 while the one or more sensors (e.g., an IMU) indicate that the wearable device 114 has a first roll value, which then causes a target device (e.g., television 102 in FIG. 1C) that is communicatively coupled to the wearable device to perform a first input command (e.g., a pause command as shown in FIG. 1C). Continuing this example, after the user's wrist has been rotated such that the device 114 now has a second roll value, the same digit-to-digit is again provided, thereby causing performance of a different input command at the television 102 in FIG. 1D (fast-forward command is executed).

(A2) In some embodiments of the method of (A1), the indication received at the first point in time and the other indication received at the second point in time are both detected based on neuromuscular signals sensed by an Electromyography (EMG) sensor of the one or more sensors of the wearable device.

(A3) In some embodiments of the method of any of (A1)-(A2), the indication received at the first point in time and the other indication received at the second point in time are both detected based on vibration signals sensed by an Inertial Measurement Unit (IMU) of the one or more sensors of the wrist-wearable device.

(A4) In some embodiments of the method of any of (A1)-(A3), the target device is separate and distinct from the wearable device.

(A5) In some embodiments of the method of any of (A1)-(A4), prior to receiving the indication at the first point in time that the user is providing the digit-to-digit gesture, the method includes establishing a communication channel with the target device, without requiring any input from the user. For example, establishing a communication channel without requiring any input from the user helps to establish an improved man-machine interface in which the user is able to provide fewer inputs to achieve the desired outcome of controlling the target device. In this example, the user provides no inputs in order to achieve that desired outcome, thereby offering a significant improvement in the man-machine interface and helping to ensure that users are able to maintain a sustained interaction with the wearable device and also with the target device.

(A6) In some embodiments of the method of (A5), an ultra-wideband (UWB) antenna of the wrist-wearable device is used for establishing the communication channel. For example, the wearable device has UWB antennas that are used to transmit data and localize antennas. The device 114 can make use of the UWB antennas to search for and pair with the target device, in addition to exchanging authentication information in certain embodiments or circumstances. As one example, if a user is signed into a social-media account (e.g., a Facebook account) on the target device, the target device is already set up to authenticate with the device 114 that is also signed into the same social-media account. In this way, the communication channel can be quickly established via the UWB antennas.

(A7) In some embodiments of the method of (A5), the method further includes—in response to detecting that the wrist-wearable device has moved closer to a second target device than to the target device—establishing a second communication channel with the second device instead of the target device, without requiring any input from the user. The first communication channel is then ceased or terminated. The method further includes, receiving an additional indication at a third point in time that the user intends to perform the digit-to-digit gesture once again. In accordance with a determination that the digit-to-digit gesture that is once again provided is provided while the one or more sensors indicate that the wrist-wearable device has a third roll value, the method includes causing the second device to perform a third input command, using the second communication channel. An example of this is shown in FIG. 1E, which is described in more detail below.

(A8) In some embodiments of the method of any of (A1)-(A7), the target device is the wrist-wearable device. Examples in which the target device is the wrist-wearable device are provided with reference to FIGS. 5A-5B.

(A9) In some embodiments of the method of (A8), the method also includes controlling a user interface on the display of the wrist-wearable device based on additional sensor data from an Inertial Measurement Unit (IMU) of the one or more sensors of the wrist-wearable device.

(A10) In some embodiments of the method of (A9), controlling the user interface on the display of the wrist-wearable device includes changing zoom levels on a map based on yaw values of the wrist-wearable device.

(A11) In some embodiments of the method of any of (A1)-(A10), the first input command and the second input command control video playback on the target device.

(A12) In some embodiments of the method of any of (A1)-(A11), the first input command and the second input command control navigation of photos at the target device.

(A13) In some embodiments of the method of any of (A1)-(A12), the first input command and the second input command control a gaming interface of the target device.

(A14) In some embodiments of the method of any of (A1)-(A13), selecting different input commands as the first and second input commands based on whether biometric data sensed at the wrist-wearable device indicates that the user is a first user or a second user. For example, when the wrist-wearable device is used as a gaming controller in an artificial-reality environment, the commands used for different users can be configured differently. For instance, a first user might prefer that a jump command is executed while the first gesture is received while the wearable device has the first roll value, but a different second user might prefer that a sprinting command is executed while the first gesture is received while the wearable device is worn by the different, second user and the wearable device has the first roll value. This is further shown and described with reference to FIGS. 4A and 4B.

(A15) In some embodiments of the method of any of (A1)-(A14), the method also includes selecting sensed-value thresholds that are specific to the user, the sensed-value thresholds used by the wrist-wearable device for detecting one or both of (i) the digit-to-digit gesture and (ii) the first and second roll values for different users of the wrist-wearable device.

(A16) In some embodiments of the method of any of (A1)-(A14), the first input command is selected based on a device state of the target device.

(A17) In some embodiments of the method of (A16), wherein the device state includes information regarding an application that is executing on the target device when the indication is received. For example, the application is one that is currently executing in a foreground such that a user interface for the application is currently visible on a screen of the target device, and the device state can provide information concerning what is currently displayed within the application while the wrist-wearable device receives the indication that the user intends to perform the digit-to-digit gesture.

(A18) In some embodiments of the method of (A16), while the target device is displaying a first application, the first input command causes the target device to perform a first action; and while the target device is displaying a second application, the first input command also causes the target device to perform the first action. In other words, the same first action can be performed for two different applications.

(A19) In some embodiments of the method of (A16), while the target device is displaying a first application, the first input command causes the device to perform a first action; while the target device is displaying a second application, the first input command causes the device to perform a second action distinct from the first action. In other words, different actions can be performed for two different applications. For example, the first action may be going to a previous page in a web application and the second action may be causing an avatar to jump in a gaming application. Whether to perform same or different actions can be a preference that is configured by the user.

(B1) A wrist-wearable device for controlling devices, the wrist-wearable device configured to perform or cause performance of the method of any of (A1)-(A19).

(B2) A capsule portion of a wrist-wearable device, wherein: the capsule is configured to couple with a band to form a wrist-wearable device, and the capsule includes one or more processors configured to perform or cause performance of the method of any of any of (A1)-(A19).

(B3) A nontransitory, computer-readable storage medium including instructions that, when executed by a wrist-wearable device, cause the wrist-wearable device to perform or cause performance of the method of any of (A1)-(A19).

(B4) A system including a wrist-wearable device and a target device, wherein the wrist-wearable device is configured to perform or cause performance of the method of any of (A1)-(A19).

(B5) A wrist-wearable device that includes means for performing or causing performance of the methods of any of (A1)-(A19).

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 1A depicts the user with the wrist-wearable device being too far away from the target device to establish a connection, in accordance with some embodiments. FIG. 1B depicts the user having moved closer to the target device to then establish a connection, in accordance with some embodiments. FIG. 1C next depicts that the user performs a digit-to-digit gesture while the wrist-wearable device has a first roll value, which then causes the target device to execute a video-playback command, in accordance with some embodiments. FIG. 1D next depicts that the user performs the same digit-to-digit gesture while the wrist-wearable device has a second roll value, which then causes the target device to execute a different video-playback command, in accordance with some embodiments. Then, FIG. 1E depicts that once the user moves closer to a different target device, a connection with that different target device is then established, in accordance with some embodiments.

FIG. 4A depicts photos navigation control and FIG. 4B depicts controlling a gaming interface at the target device, in accordance with some embodiments.

FIGS. 5A-5B, depict that digit-to-digit gestures detected by the wrist-wearable device, while it has various yaw values, can also cause performance of different commands related to altering zoom levels in a maps application, at the target device, in accordance with some embodiments.

FIGS. 6A-6D show a flow diagram of interpreting a digit-to-digit gesture based on roll values for a wrist-wearable device, in accordance with some embodiments.

FIG. 9 is a flow diagram of an exemplary method for sensing gestures via vibration-sensitive wearables donned by users of artificial-reality systems, in accordance with some embodiments.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The disclosed implementations provide systems and methods of interpreting a digit-to-digit gesture based on roll values for a wrist-wearable device and provide richer gesture sets by allowing for the same digit-to-digit gesture to cause performance of different commands, dependent on a roll value present when the digit-to-digit gesture is provided.

Figure 1A:
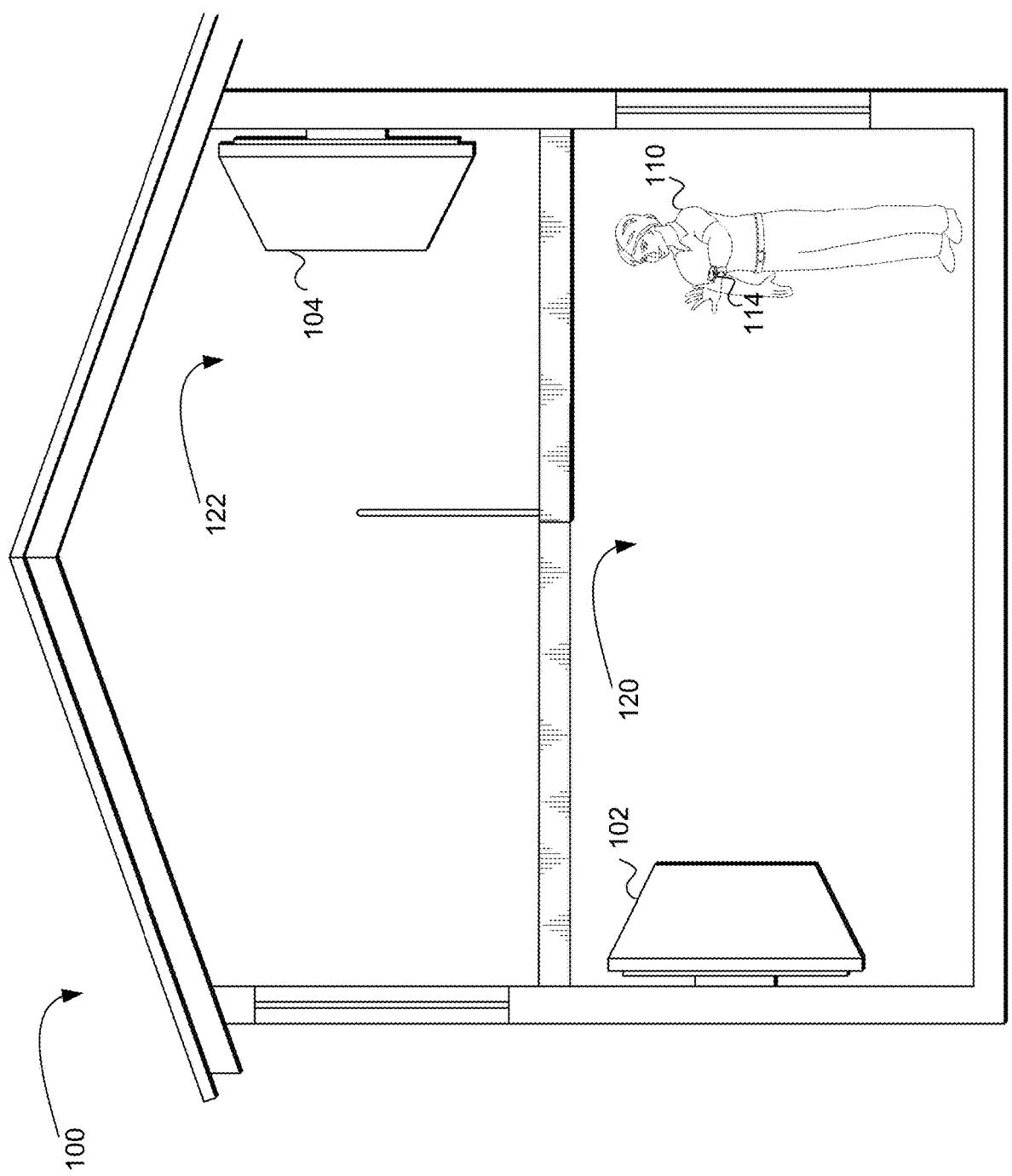
FIGS. 1A-1E graphically depict a sequence in which a user is able to provide digit-to-digit gestures that are detected by a wrist-wearable device while it has different roll values and to then cause performance of commands at a target device (e.g., a television), in accordance with some embodiments. In particular.

FIG. 1A depicts the user with the wrist-wearable device being too far away from the target device to establish a connection, in accordance with some embodiments. First setting 100 may include first environment 120 and second environment 122, which can be different rooms of a house or office building.

Wrist-wearable device 114 can be configured to interpret a digit-to-digit gesture (e.g., one finger touching a thumb) into many different available gestures, by disambiguating which of the different gestures was intended by reference to a roll value at the device 114 when the digit-to-digit gesture was provided. In this way, a user can simply rotate their wrist to different positions (causing the IMU to detect different roll values for the device 114) and then provide digit-to-digit gestures while the device 114 has the different roll values, thereby opening up a rich set of new gestures. Detection of the digit-to-digit gesture itself can be done using Electromyography (EMG) sensors (e.g., EMG Sensor 1046 in FIG. 8) configured to detect a user's intention to perform a gesture prior to the user performing the digit-to-digit gesture, as well as (or as alternatives to) using data from an Inertial Measurement Unit (IMU) sensor(s) (e.g., IMU sensor 1042 in FIG. 8). In addition to use of the roll values, in some embodiments, the device 114 can also make use of yaw and/or pitch values from the IMU sensor 1042 to enable additional interactions at the device 114.

As such, one digit-to-digit gesture can allow for a number of different gestures, simply by looking at the roll values when the gesture was provided. This also allows for an improved man-machine interface, in which the user 110 is able to provide fewer inputs to achieve desired outcomes. In some instances, the desired outcome may be controlling a target device through a wrist-wearable device with minimal user input (and, additionally or alternatively, without a user needing to look down at the device 114 while performing the digit-to-digit gesture). The digit-to-digit gesture can include any action in which one of the user's fingers is intended to touch another of the user's fingers without contacting the display of the wearable device (e.g., an index finger touching a thumb also known as a digit-to-digit pinch gesture). Example digit-to-digit gestures that are performed while the device 114 has different roll values are described below, in particular in reference to FIG. 1C (digit-to-digit gesture performed while roll value of the device 114 is such that the display of the device 114 is facing toward a ceiling); 1D (digit-to-digit gesture performed while roll value of the device 114 is such that the display of the device 114 not facing toward the ceiling); 2A-2B (examples of the same digit-to-digit gesture performed while device 114 has different roll positions, resulting in performance of different photo-navigation-related commands); 3A-3B (examples of the same digit-to-digit gesture performed while device 114 has different roll positions, resulting in performance of different gaming-related commands); among others.

Figure 1B:
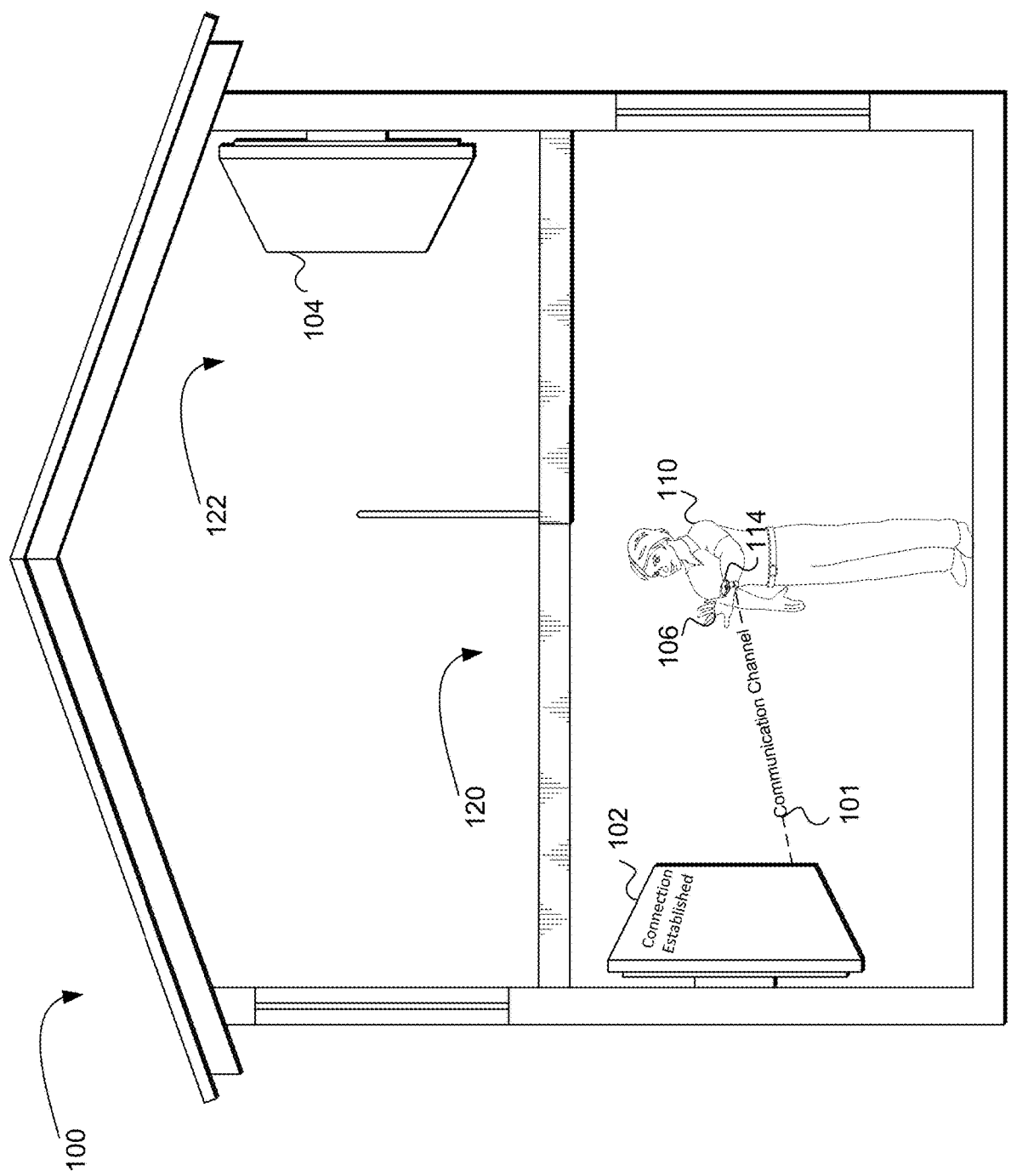

FIG. 1B depicts the user, having moved closer to the target device, then establishing a connection, in accordance with some embodiments. A communication channel 101 may be established with any target device present in first environment 120 (e.g., television 102, or any other target device such as a computer or mobile phone). The target device may be distinct from the wrist-wearable device 114 or may be the wrist-wearable device 114. Establishing a communication channel 101 without requiring any input from the user helps to ensure an improved man-machine interface, as sustained interactions, in which the user 110 is able to provide fewer inputs to achieve desired outcomes (e.g., controlling the target device, such as television 102). In this example, the user 110 provides no inputs in order to establish a communication channel 101 with the target device (e.g., television 102), thereby offering a significant improvement to the man-machine interface and helping to ensure that users are able to seamlessly maintain a sustained interaction with the wrist-wearable device 114 and also with television 102, as will be described in more detail below.

Although the target device is a television 102 in this example, the target device can be any device that is separate and distinct from the wrist-wearable device 114. Target devices can include any device with communication channel connectivity capabilities. For example, target devices can include a television 102 in first environment 120 or television 104 in second environment 122. Broken lines leading from wrist-wearable device 114 to target devices (e.g., television 102) are used to indicate an established communication channel 101.

Figure 8:
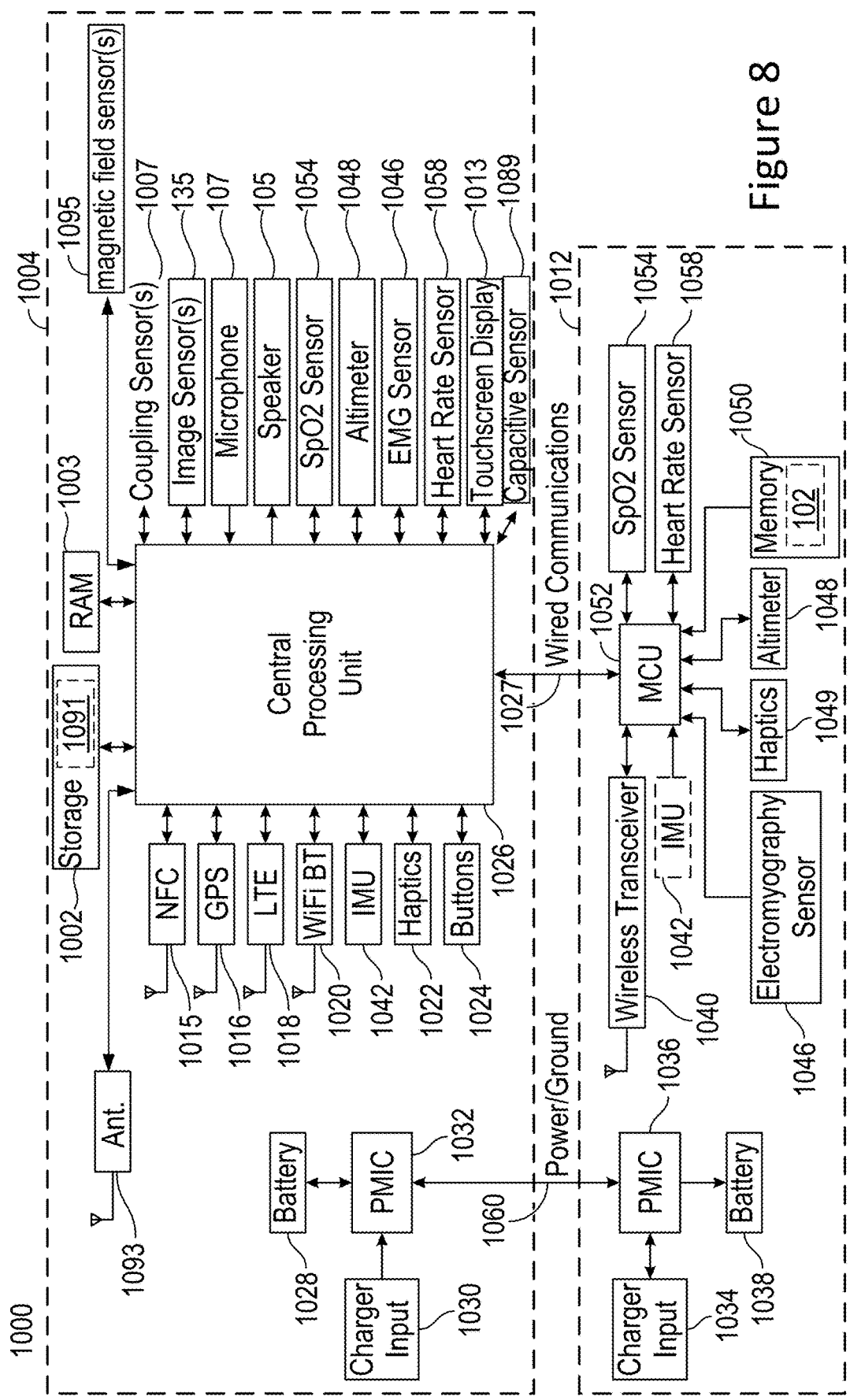
FIG. 8 is a block diagram of a wrist-wearable device system, in accordance with some embodiments.

Depending on the physical distance between the wrist-wearable device 114 and the target device, data from ultra-wideband (UWB) antennas (e.g., antenna 1093; FIG. 8) may be used for establishing the communication channel. In some embodiments, communication channels 101 may be established based on a distance between the wrist-wearable device 114 and the target device, without requiring any input from the user. For example, in response to the wrist-wearable device 114 detecting that the user 110 is closer to a first target device than to a second target device, the wrist-wearable device 114 will establish a communication channel 101 between the first target device instead of the second target device. In other embodiments, an application on the wrist-wearable device 114 may offer a list of paired devices, and the user 110 may select which device to control with the wearable device 114.

User 110 may be wearing wrist-wearable device 114 on their wrist. The wrist-wearable device 114 may be used to control other devices, such as target devices, based on inputs at the wearable device interface itself, such as digit-to-digit gestures that can be detected based on sensed neuromuscular signals and/or IMU sensor data. In some embodiments, the digit-to-digit gestures provided at the wrist-wearable device 114 can allow for controlling a mouse or pointer on a target device (such a mouse or pointer displayed on a television or computer monitor). The target device may be separate and distinct from the wrist-wearable device or it may be the same device as the wearable device 114.

The wrist-wearable device 114 can also function as a human-interface device (such as a Bluetooth™ or UWB human-interface device) with similar operational functionalities as a combined keyboard and mouse system to control functions at the target device, and may work out-of-the box with any electronics that supports the combined keyboard and mouse input modality (e.g., all Android and iOS devices, computers running Windows, Linux, Mac, certain embedded systems, etc.) once the wearable device has paired with them.

Figure 1C:
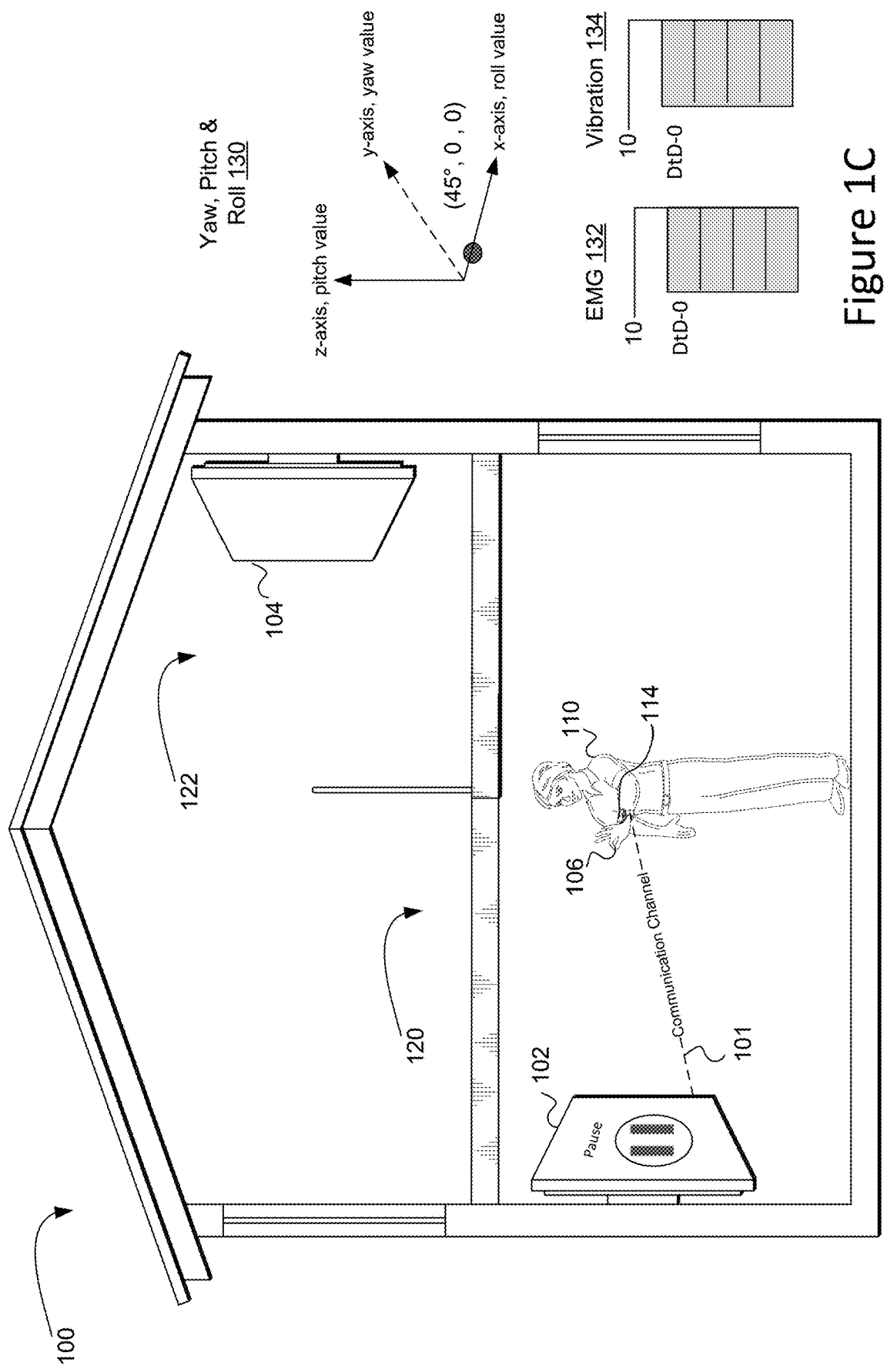

FIG. 1C next depicts that the user performs a digit-to-digit gesture while the wrist-wearable device has a first roll value, which then causes the target device to execute a video-playback command, in accordance with some embodiments. The wrist-wearable device 114 may receive an indication at a first point in time, for example at 12:00 PM, that the user 110 intends to perform a digit-to-digit gesture 106. The intention to perform the digit-to-digit gesture 106 may be sensed based on neuromuscular signals that are detected using an EMG sensor 1046. The neuromuscular signals can allow the device 114 to determine that a user is going to perform the digit-to-digit gesture before the motor actions to cause the digit-to-digit gesture actually occur. Additionally, or alternatively, data from an IMU sensor 1042, such as a vibration sensor that can pick up vibrations at the wrist-wearable device 114 that are caused by the user's performance of the digit-to-digit gesture (additional details regarding how IMU sensor data can be used to detect digit-to-digit gestures is provided below in reference to FIG. 9), can be used to detect actual performance of the digit-to-digit gesture. Representations of sensed values detected by the EMG sensors are shown in EMG sensor plot 132 and in IMU sensor vibration data plot 134. These representations are not intended to accurately depict sensor values when a digit-to-digit gesture is intended or actually performed, but are instead rough approximations indicating that once the EMG and/or vibration sensor data crosses certain thresholds (illustrated as DtD-0 in the plots EMG sensor plot 132 and IMU vibration data plot 134), then that data is sufficient to allow for detection of a digit-to-digit gesture. The DtD-0 threshold need not be a fixed quantity, but can reflect a process in which sensed values are analyzed using a machine-learning model to make a determination that a digit-to-digit gesture is intended or actually being performed (the threshold, in this sense, can then reflect the machine-learning models determination that the data that was input to the model, which can be EMG signals and/or vibration data, indicates that a digit-to-digit gesture is intended or being performed). In the example of FIG. 1C, because the EMG and IMU vibration data plots indicate that the respective sensed values have crossed the relevant threshold DtD-0, then a digit-to-digit gesture has been detected. In some embodiments, multiple different thresholds are stored to allow for detecting of different types of digit-to-digit gestures, such as one threshold for the index finger contacting a user's thumb, a different threshold for the middle finger contacting a user's thumb, etc. In the example of FIG. 1C, the digit-to-digit gesture 106 that is detected is a digit-to-digit pinch gesture in which the user 110 has moved their index finger to contact their thumb.

Because the digit-to-digit gesture is detected in the example of FIG. 1C while the one or more sensors indicate that the wrist-wearable device 114 has a first roll value (e.g., a roll value reflecting that the display of device 114 is facing upwards or facing toward the ceiling), the wrist-wearable device 114 may cause the television 102 to perform a first input command (e.g., a pause command as shown on television 102 in FIG. 1C). As shown on television 102, this input command may control video playback on the target device.

Figure 1D:
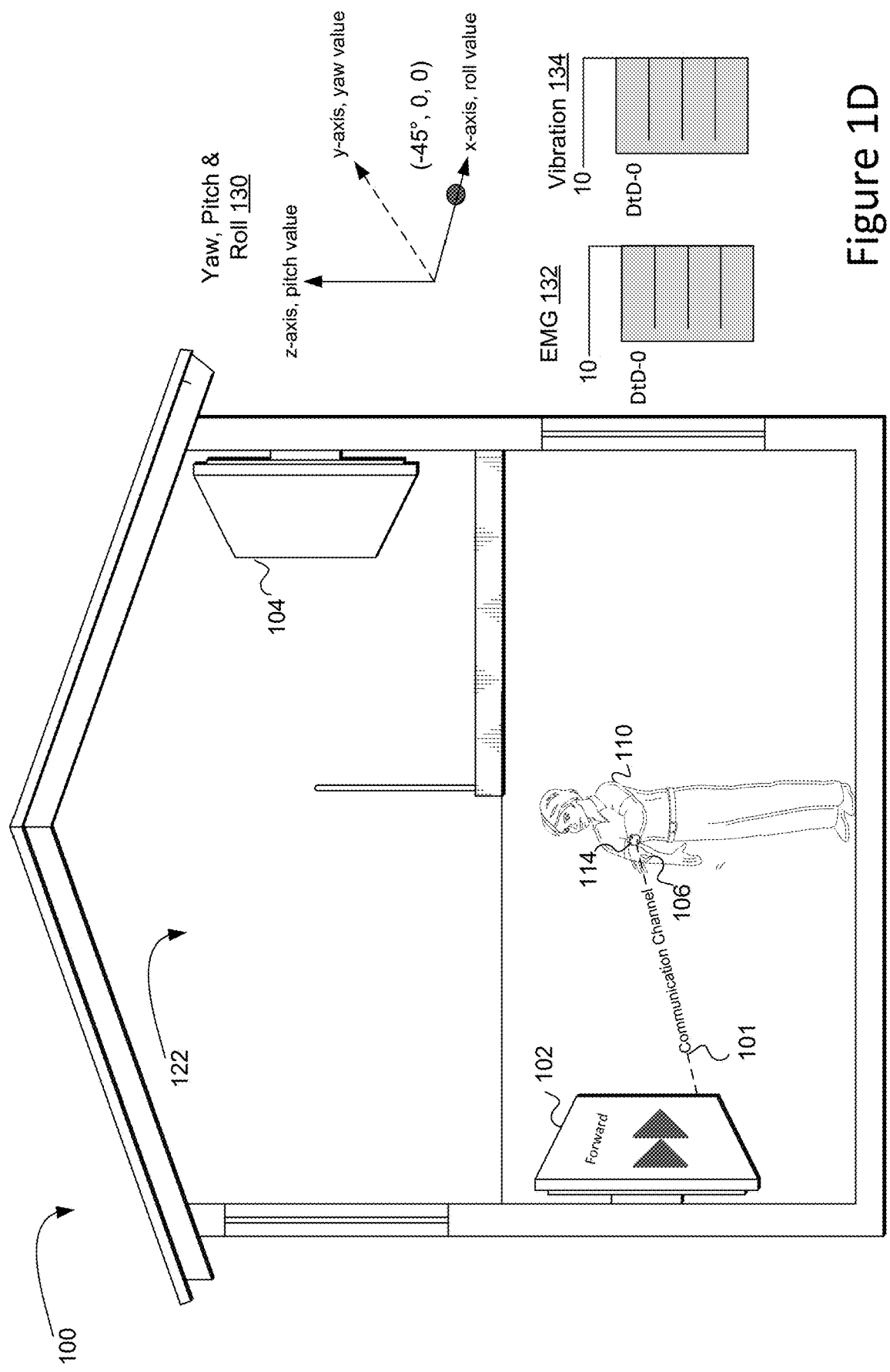

FIG. 1D next depicts that the user 110 performs the same digit-to-digit gesture 106 while the wrist-wearable device 114 has a second roll value, which then causes the target device (e.g., television 102) to execute a different video-playback command, in accordance with some embodiments. Yaw, pitch, and roll plot 130 provides a rough illustration showing that the IMU sensor 1042 of the device 114 can provide angular estimates for each of the yaw, pitch, and roll values. These values change as the user moves their wrist around to different positions.

At a second point in time, for example at 12:30 PM, an indication may be received by the EMG sensors that the user 110 intends to perform the gesture 106 once again after having already performed the gesture 106 at the first point in time that was before the second point in time. The intention to perform the digit-to-digit gesture 106 may be sensed based on neuromuscular signals sensed using an EMG sensor 1046 (and/or based on vibration data from an IMU sensor 1042). Yaw, pitch, and roll plot 130 also shows in FIG. 1D that a roll value of the device 114 has shifted to be a second roll value that is different from the first roll value. In particular, when the digit-to-digit gesture 106 is performed in the example of FIG. 1D, it is performed after the user has rotated their left wrist in a clockwise direction such that the display of the device 114 is no longer pointing toward the ceiling.

Because the digit-to-digit gesture is detected in the example of FIG. 1D while the one or more sensors (e.g., EMG sensor 1046 and/or IMU sensor 1042) indicate that the wrist-wearable device 114 has a second roll value (e.g., watch facing downwards or an approximately 90 degree rotation in a clockwise direction from the position of wearable device 114 in FIG. 1C), the wrist-wearable device 114 may cause the target device to perform a second input command that is distinct from the first input command (e.g., the second input command can be a fast-forward command as shown on television 102 in FIG. 1D). As shown on television 102, this input command may control video playback on the target device. In this way, one digit-to-digit gesture 106 may allow for a number of different gestures, causing performance of different input commands, simply by having the device 114 look at the roll values when each digit-to-digit gesture is detected. This is reflected between FIGS. 1C and 1D where one digit-to-digit gesture allows for different video playback commands simply because of the differing roll values.

Figure 1E:
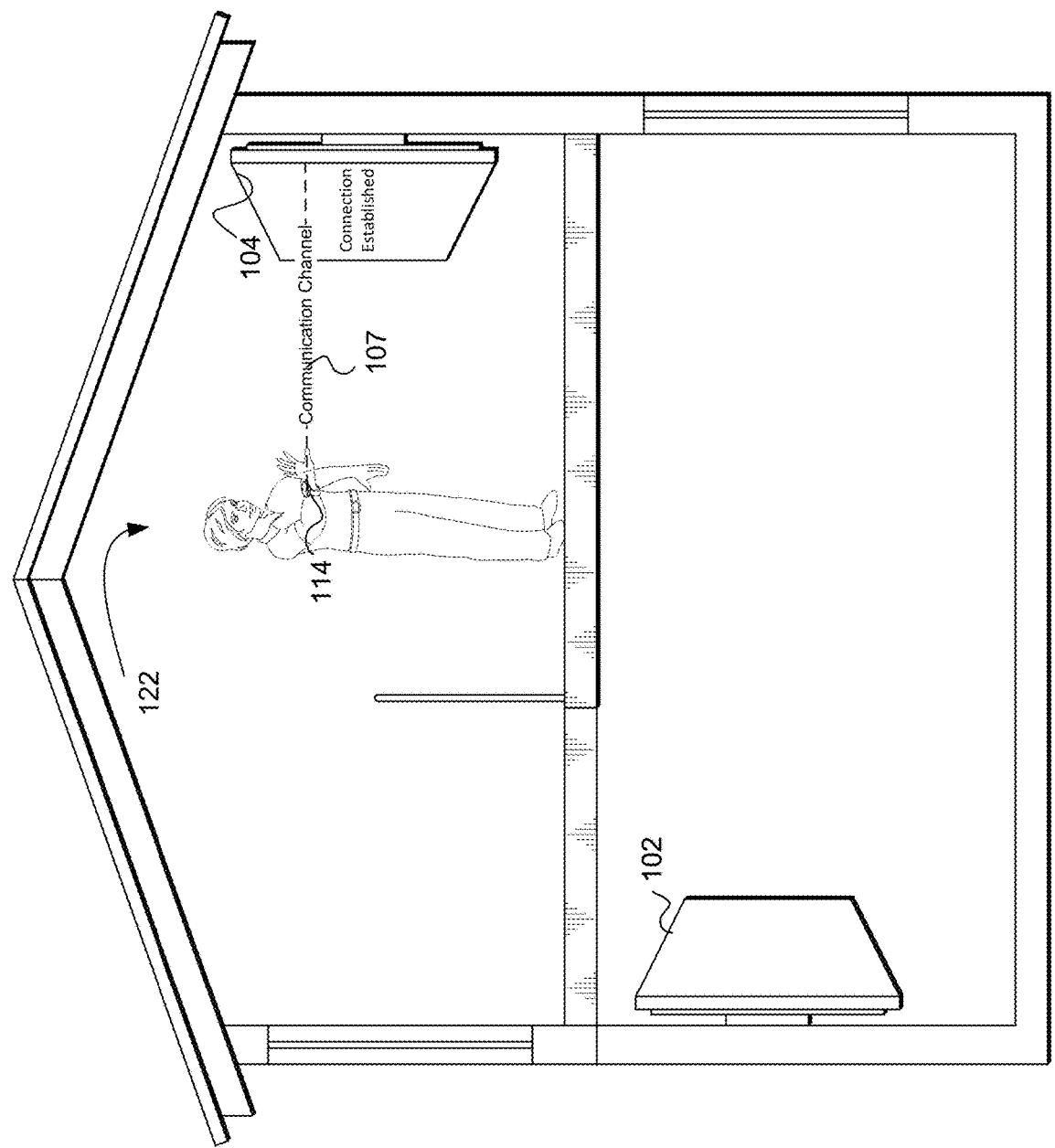

FIG. 1E depicts that once the user moves closer to a different target device, a connection with that different target device is then established, in accordance with some embodiments. In the depicted example of FIG. 1E, when user 110 donning wrist-wearable device 114 moves from a first environment 120 to a second environment 122 of the first setting 100 (e.g., from first environment 120 to second environment 122, such as a first room to a second room of a house or office building) wrist-wearable device 114 may disconnect the communication channel with TV 102 in first environment 120 and establish a new communication channel with a second target device due to wrist-wearable device 114 detecting that it has moved closer to a second television 104 in second environment 122. The determinations as to how close a user is to different target devices can be performed using data exchanged via ultra-wideband (UWB) antennas (of the device 114 and of the target device or devices). After the new communication channel is established with the new target device (e.g., second television 104), then digit-to-digit gestures performed at the device 114 cause performance of commands at the new target device (e.g., second television 104) instead of the target device (e.g., television 102). In this way, users are able to quickly and easily move around their locations to control various target devices and, oftentimes, need not provide any inputs or even look at the display of the device 114 as they move between areas and begin controlling different devices. In some embodiments, when a new communication channel is established, the new target device presents a message indicating as much (e.g., a message of "Connection Established" is displayed on new target device 104 once the new communication channel has been established).

Figure 2A:
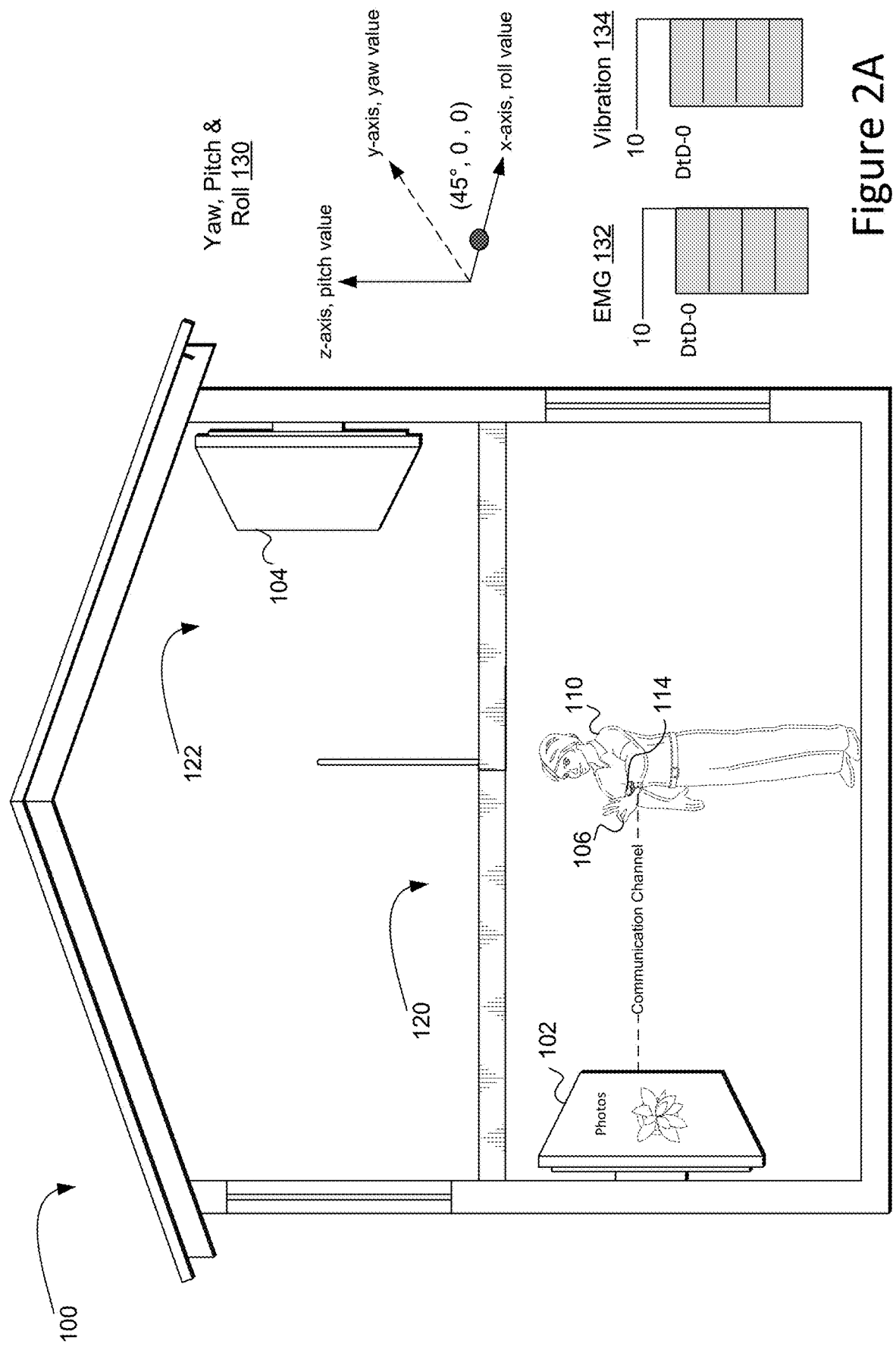
FIGS. 2A-2B depict that digit-to-digit gestures detected by the wrist-wearable device, while it has various roll values, can also cause performance of different commands related to navigation through photos at a target device, in accordance with some embodiments.
Figure 2B:
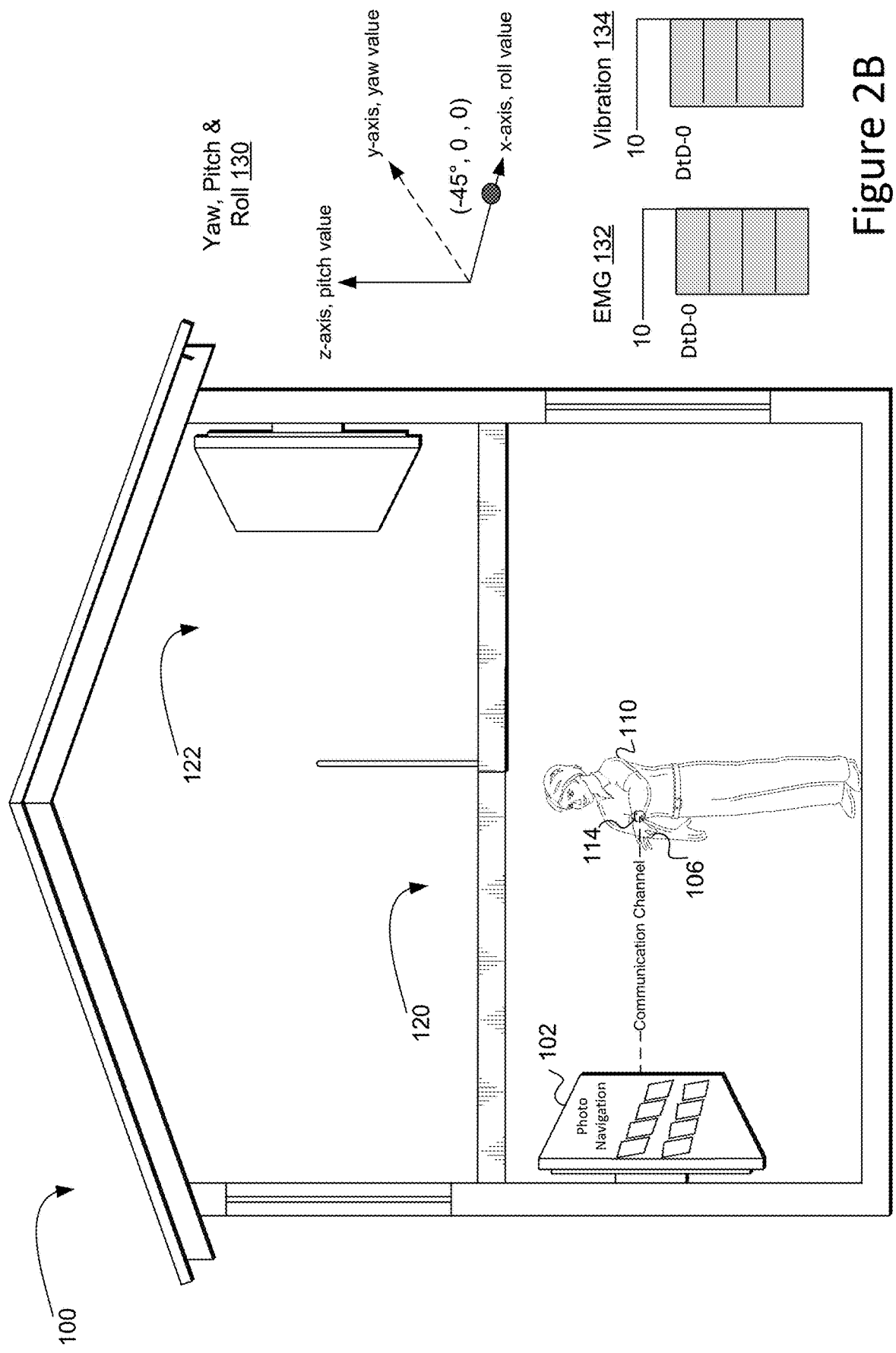

While the input commands shown in the examples of FIGS. 1A-1E relate to control of video playback, other input commands can also be executed based on detected digit-to-digit gestures. As another example, FIGS. 2A-2B depict that digit-to-digit gestures detected by the wrist-wearable device while it has various roll values can also cause performance of different commands related to navigation through photos at a target device, in accordance with some embodiments. In some embodiments, and as is further explained below, the input commands to be performed responsive to digit-to-digit gestures can be based on a device state for the target device (such as a state indicating which application is displayed in a foreground of the target device, such that appropriate input commands are chosen for the current foreground application).

For example, after controlling video playback as shown after the digit-to-digit gestures detected in the example scenarios of FIGS. 1C and 1D, user 110 may need to access photos on television 102. The wrist-wearable device 114 may receive an indication at a first point in time, for example at 1:00 PM, that the user 110 intends to perform a pinch gesture. The digit-to-digit gesture 106 can be detected based on sensor values from an EMG sensor 1046 and/or an IMU sensor 1042 (as was explained above). As with the plots EMG sensor plot 132 and IMU vibration data plot 134 of FIGS. 1C-1D, the plots in FIGS. 2A-2B also show that sensor values have crossed the thresholds indicating that a digit-to-digit gesture has been detected.

Because the digit-to-digit gesture in the example of FIG. 2A is detected while the one or more sensors (e.g., IMU data that can be used to estimate yaw, pitch, and roll values) indicate that the wrist-wearable device 114 has a first roll value (e.g., watch facing upwards or facing the sky), the wrist-wearable device 114 causes the television 102 to perform a first input command (e.g., a photos application selection in FIG. 2A).

FIG. 2B next depicts that the same digit-to-digit gesture 106 from the example of FIG. 2A (e.g., movement of the user's index finger and thumb such that they contact one another) is detected by the wrist-wearable device while it has a second roll value different from the first roll value in FIG. 2A, in accordance with some embodiments.

With continued reference to FIG. 2A, at a second point in time, for example at 1:30 PM, an indication may be received by the EMG sensors that the user 110 intends to perform the gesture 106. Because the digit-to-digit gesture 106 is detected while the device 114 has the second roll value that is different from the first roll value (e.g., display of device 114 no longer facing toward the ceiling and instead having been rotated about 90 degrees in a clockwise direction in FIG. 2B related to its position in FIG. 2A), the target device is caused to perform a different input command (relative to the first input command of the FIG. 2A example), which causes navigation through the photos at the target device. In the example of FIG. 2B, the second input command is a photos navigation command as shown on television 102 in FIG. 2B, in which the target device (e.g., television 102) is caused to navigate through the user's photos (different than the photo selection command depicted in FIG. 2A in which an individual photo was selected for display on the target device). In this way, one digit-to-digit gesture 106 can allow for a number of different gestures, using roll values as a disambiguating variable to interpret the same digit-to-digit gesture 106 to cause performance of many different input commands.

Figure 3A:
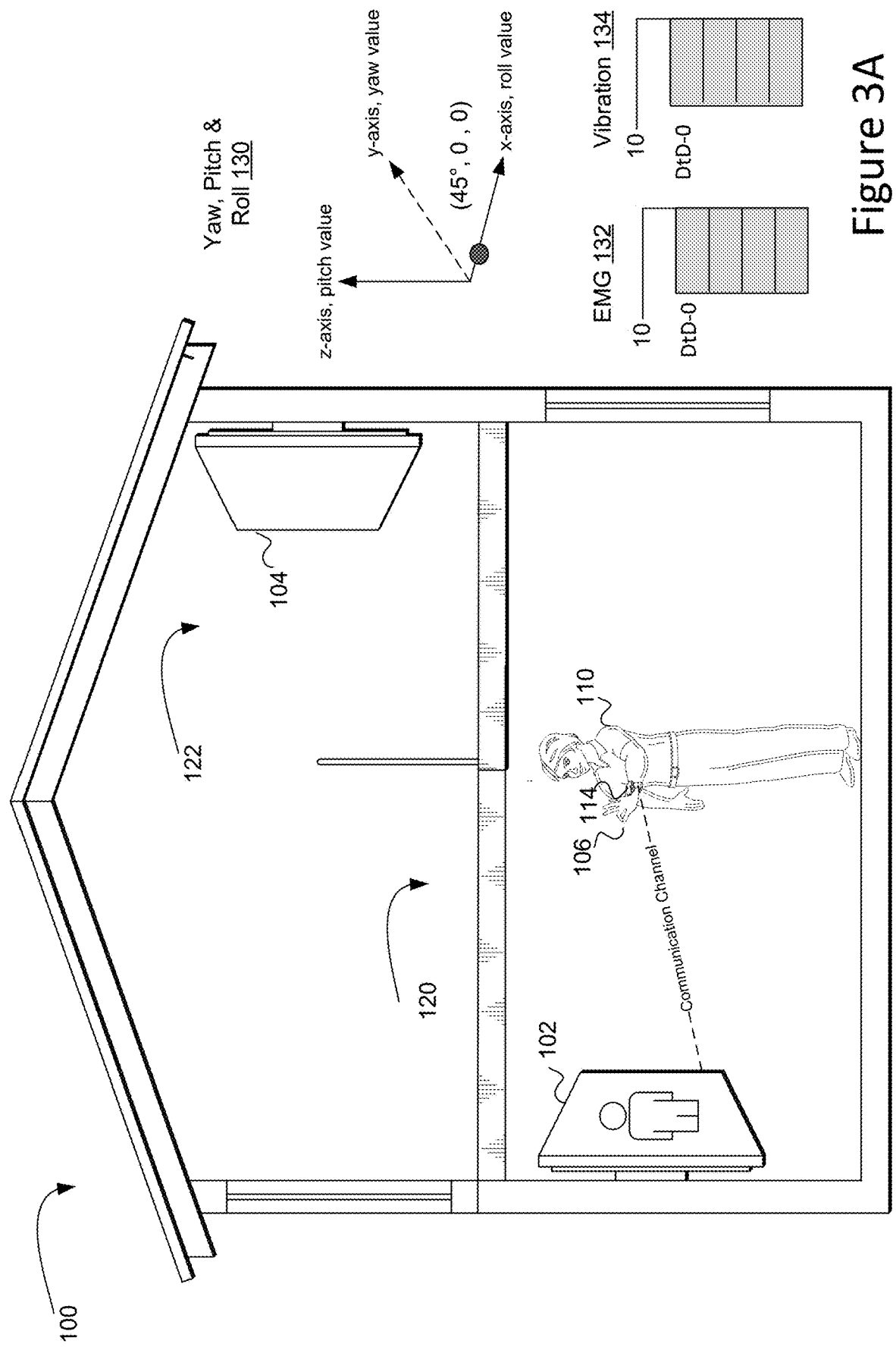
FIGS. 3A-3B depict that digit-to-digit gestures detected by the wrist-wearable device, while it has various roll values, can also cause performance of different commands related to controlling a gaming interface at the target device, while, in accordance with some embodiments.
Figure 3B:
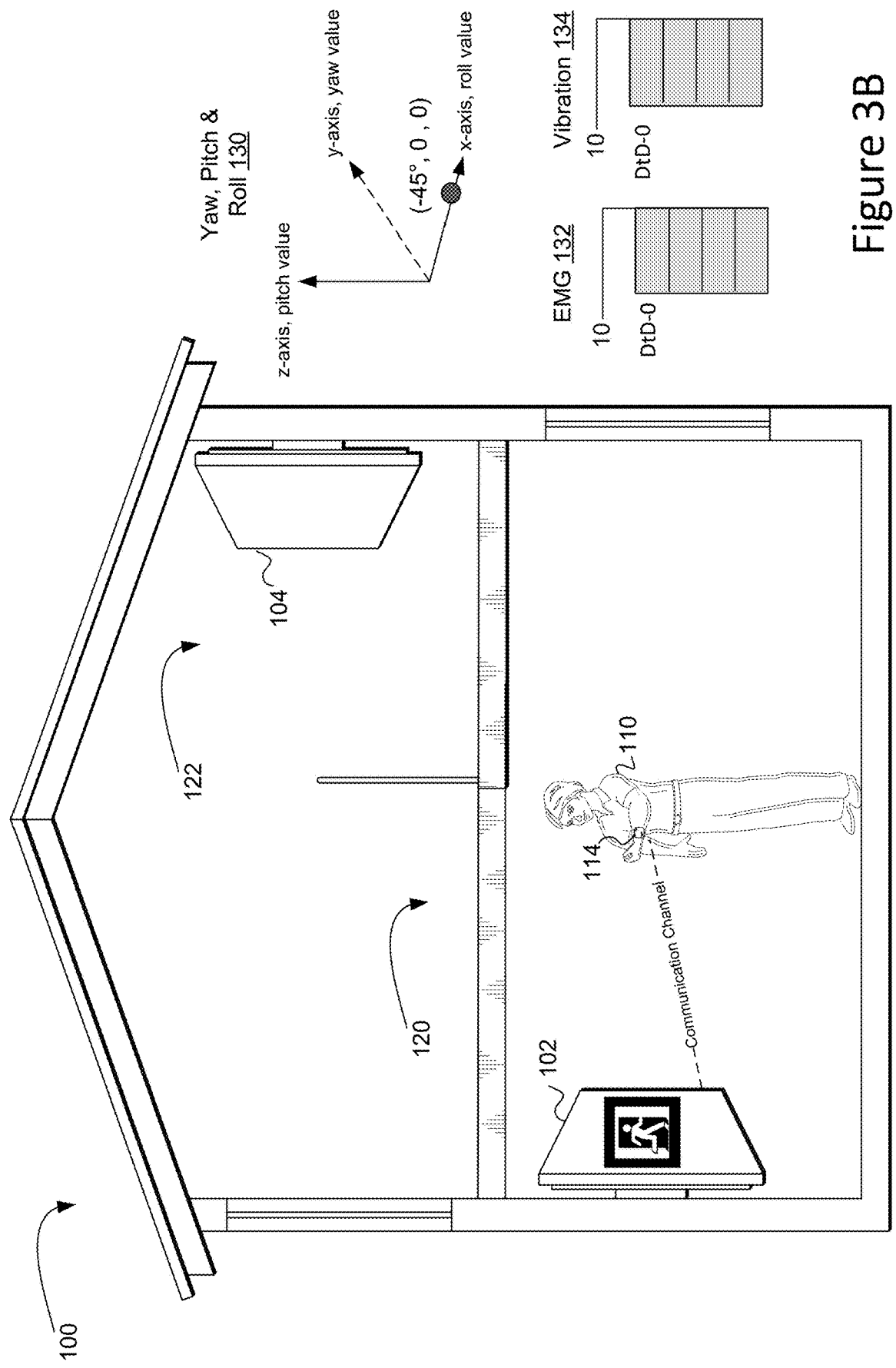

In addition to controlling video playback and photos navigation, the digit-to-digit gesture can also control other aspects. FIGS. 3A-3B provide one additional example. In particular, FIGS. 3A-3B depict that digit-to-digit gestures detected by the wrist-wearable device 114 while it has various roll values can also cause performance of different commands related to controlling a gaming interface at the target device.

For example, after controlling photos navigation as shown in FIGS. 2A and 2B, user 110 may need to access photos on television 102. The wrist-wearable device 114 may receive an indication at a first point in time, for example at 2:00 PM, that the user 110 intends to perform a digit-to-digit gesture 106. Because the digit-to-digit gesture 106 is detected while the device 114 has the second roll value that is different from the first roll value (e.g., display of device 114 no longer facing toward the ceiling and instead having been rotated about 90 degrees in a clockwise direction in FIG. 3B related to its position in FIG. 3A), the target device is caused to perform a different input command (relative to the first input command of the FIG. 3A example), which causes navigation through user in a gaming interface to run.

In the example of FIG. 3B, the second input command causes a user in a gaming interface to run (different than the user selection command depicted in FIG. 3A in which a user was selected to display on the target device).

Figure 4A:
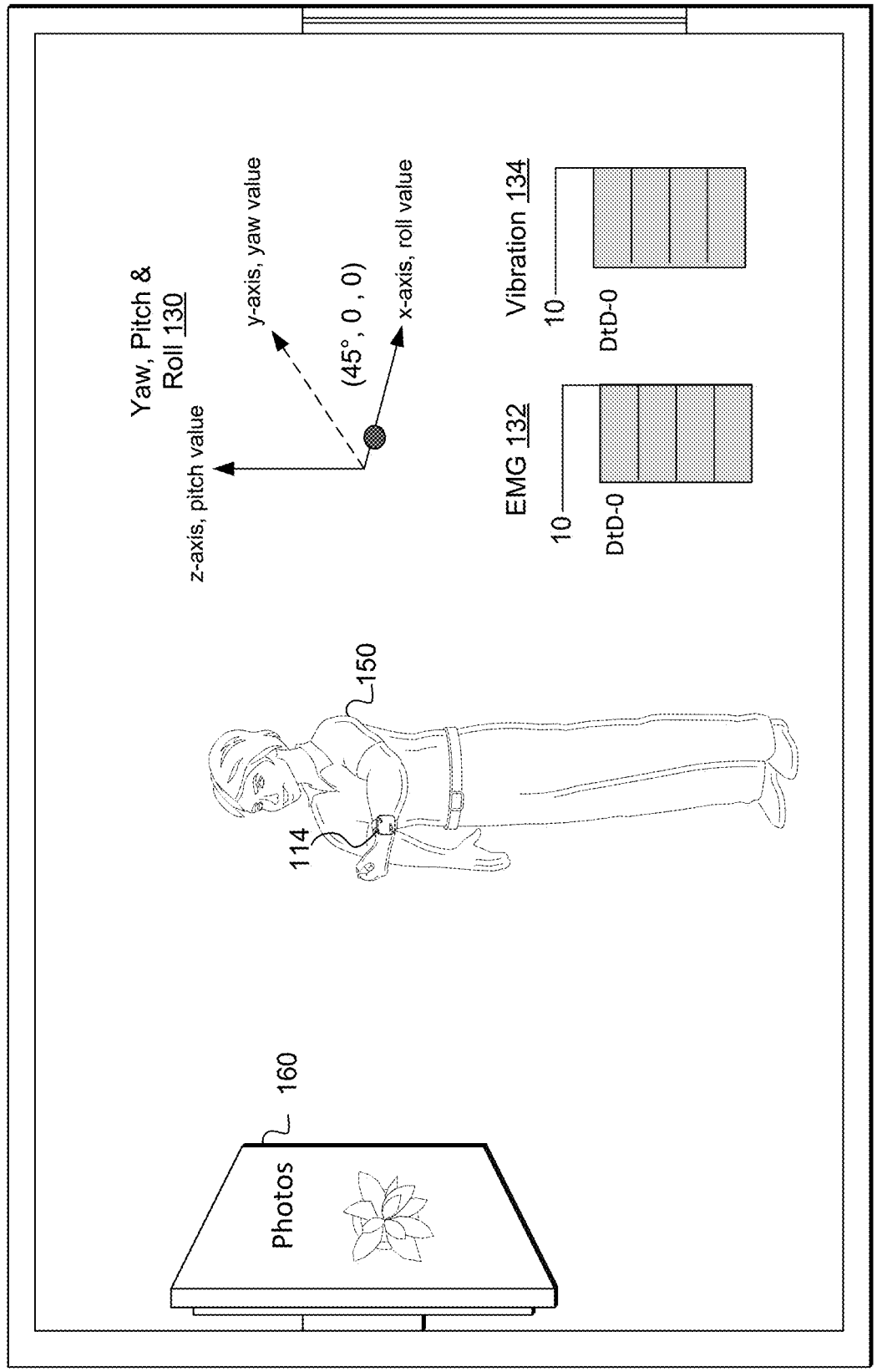
FIGS. 4A-4B depict digit-to-digit gestures detected by the wrist-wearable device, while having the same roll values, can also cause performance of different commands depending on the user. Specifically.
Figure 4B:
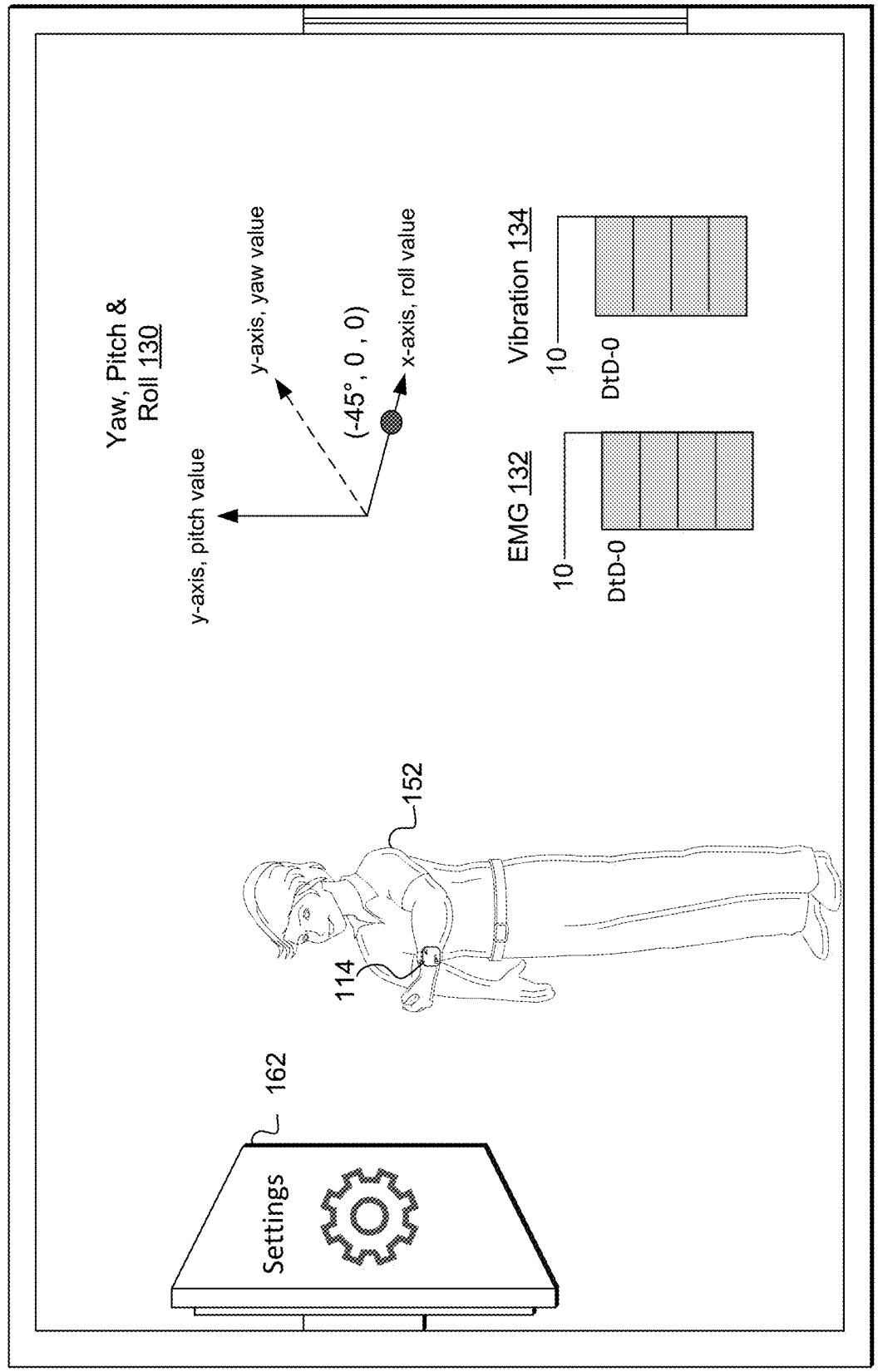

While the examples of FIGS. 1A-3B focus on use of the device 114 by a single user, the device 114 can also be a device that is shared among different users. In such circumstances, interpretation of digit-to-digit gestures at the device 114 can be customized to each of these different users. For example, FIGS. 4A-4B depict that the same digit-to-digit gesture performance by different users (a first user in FIG. 4A and a different second user in FIG. 4B), while the device 114 has the same roll value (e.g., when the first user performs the digit-to-digit gesture in the example of FIG. 4A, the device 114 has a certain roll value; when the second user performs the digit-to-digit gesture in the example of FIG. 4B, the device 114 has the same certain roll value), can also cause performance of different commands depending on which user is wearing the wrist-wearable device. In this way, the wrist-wearable device 114 can personalize its interpretation of digit-to-digit gestures for specific users. Specifically, FIG. 4A depicts a first user 150 controlling photos navigation at target device 160 and FIG. 4B depicts a second user 152 controlling a gaming interface at target device 162. Notably, both first user 110 and second user 152 are performing the same digit-to-digit gesture while the device 114 has the same roll value, yet the input command that results from performance of the gesture is different and specific to which user performed the gesture.

While the examples of FIGS. 4A-4B show that the two users are using different applications on the target device (e.g., photos application in FIG. 4A; settings application in FIG. 4B), it will be appreciated that this user-specific command interpretation also applies while different users interact with the same application. For example, if the first and second users were both using the same photos application (at different points in time), then the first user's performance of the digit-to-digit gesture while the device 114 has a certain roll value can cause performance of the first photos input command (e.g., selection of an individual photo), while the second user's performance of the digit-to-digit gesture while the device 114 has the same certain roll value can cause performance of a second photos input command (e.g., navigation through different photos). The mapping of digit-to-digit gestures to performance of certain input commands can be configured by each user during a setup or configuration process available at the device 114. As discussed in more detail below, determination of which user is using the device 114 can be based on biometric signals detected by the device 114, such that the device is able to determine which user is wearing the device 114 by analyzing these biometric signals to allow the device to select appropriate thresholds (for detecting digit-to-digit gestures for each individual user) and to select appropriate input commands based on each user's configured preferences.

Use of digit-to-digit gestures to cause performance of input commands is not limited to performance of such commands at remote or separate target devices. As such, the device 114 itself can be the target device in certain embodiments or circumstances, such that the example input commands discussed above with respect to a target device that is a separate television device can instead be performed at the device 114 itself.

Additionally, use of yaw and pitch values (in addition to, or separately from, the roll values discussed above from the IMU sensor 1042) can allow for control of other features at the device 114 (and also at remote or separate target devices). In the example of FIG. 5A, a user 402 moves their arm away from their head, which causes the yaw value of the wrist-wearable device 404 to move along the yaw axis approximately 45 degrees, resulting in a zoom-out on a map that is displayed on the display of the wrist-wearable device, in accordance with some embodiments. FIG. 5B depicts user 402 moving their arm back toward the user's head, which causes the yaw value of the device 114 to move back toward its original position before the movement from FIG. 5A, which results in a zoom-in on the map displayed on the display of the wrist-wearable device, in accordance with some embodiments. As such, FIGS. 5A and 5B indicate that various yaw values may control changing zoom levels on a map of the wrist-wearable device 404. Specifically, FIG. 5A depicts user 402 moving wrist-wearable device 404 along the yaw axis approximately 45 degrees resulting in a zoom level for the map of 50% (which can be a reduction from an initial zoom level of 100% while the device was closer to the user's head) on the wrist-wearable device 404. The arrow near the user's body in FIG. 5A illustrates that the user has moved their hand in a direction away from the user's head, thereby causing the change in the estimated yaw value for the device 114. Also, FIG. 5B depicts user 402 moving wrist-wearable device 404 along the yaw axis approximately −35 degrees resulting in a zoom level of 75% on the wrist-wearable device 404. The arrow near the user's body in FIG. 5B illustrates that the user has moved their hand in a direction back toward the user's head, thereby causing the change in the estimated yaw value for the device 114.

Similar to the use of yaw values to control map zoom levels (which could also be zoom levels for photos, other images, and the like), pitch changes at the device can also result in changing what is displayed at the device 114 (e.g., a tilt level can be adjusted based on changes in pitch values). In this way, the user can move their wrist around to cause corresponding changes in how the map (and what part of the map) is presented on the display of device 114.

In embodiments or circumstances in which the device 114 has established a communication channel with a separate target device, the use of yaw and/or pitch values can be reflected both at the device 114 and at the separate target device with which a communication channel has been established. Thus, the user is able to both control how an image or map is presented (as two nonlimiting examples), while also using digit-to-digit gestures to then drive performance of various input commands (at either or both of the device 114 and a separate target device).

FIGS. 6A-6D show a flow diagram of operations associated with a method of optimizing performance for a wrist-wearable device based on a position of a portion of the wrist-wearable device relative to a user's body, in accordance with some embodiments. In particular, a method 600 of controlling devices using a wrist-wearable device 114 (FIGS. 1A-4B) is provided. The method 600 can be performed at a wrist-wearable device 114 including a display and one or more sensors configured to detect yaw, pitch, and roll values for the wrist-wearable device 114.

The method 600 includes receiving (602) an indication at a first point in time that a user donning the wrist-wearable device 114 is providing a digit-to-digit gesture in which one of the user's digits would touch another of the user's digits without contacting the display of the wrist-wearable device 114. For example, as described above in reference to FIGS. 1A-4B, a digit-to-digit gesture can include the user touching a finger to their thumb. The method 600 includes, in accordance with a determination that the digit-to-digit gesture is provided while data from the one or more sensors indicates that the wrist-wearable device 114 has a first roll value, causing (604) a target device that is in communication with the wrist-wearable device to perform a first input command. Different examples of the input commands are provided above in reference to FIGS. 1A-5B. In some embodiments, the target device is (606) separate and distinct from the wrist-wearable device 114. In some embodiments, the target device is (612) the wrist-wearable device 114.

The method 600 includes receiving (610) another indication at a second point in time that is after the first point in time that the user is providing the digit-to-digit gesture again. In some embodiments, the indication received (612) at the first point in time and the other indication received at the second point in time are both detected based on neuromuscular signals sensed by Electromyography (EMG) sensors of the one or more sensors of the wrist-wearable device 114. In some embodiments, the indication received (614) at the first point in time and the other indication received at the second point in time are both detected based on vibration signals sensed by Inertial Measurement Units (IMUs) of the one or more sensors of the wrist-wearable device 114. The digit-to-digit gesture detection based on vibration signals are described above in reference to FIGS. 1A-1D.

The method 600 includes, in accordance with a determination that the digit-to-digit gesture is provided again while data from the one or more sensors indicates that the wrist-wearable device 114 has a second roll value that is distinct from the first roll value, causing (615) the target device to perform a second input command that is distinct from the first input command. In some embodiments, each of the first input command and the second input command controls (616) video playback at the target device. In some embodiments, each of the first input command and the second input command controls (618) navigation through photos displayed at the target device. In some embodiments, each of the first input command and the second input command controls (620) a gaming interface displayed at the target device.

In some embodiments, the method 600 includes controlling (622) a user interface on the display of the wrist-wearable device 114 based on additional sensor data from Inertial Measurement Units (IMUs) of the one or more sensors of the wrist-wearable device 114. In some embodiments, controlling (624) the user interface on the display of the wrist-wearable device 114 includes changing zoom levels on a map based on yaw values of the wrist-wearable device 114.

In some embodiments, the method 600 includes selecting (626) different input commands as the first and second input commands based on whether biometric data sensed at the wrist-wearable device 114 indicates that the user is a first user or a second user. For example, when the wrist-wearable device 114 is used as a gaming controller in an artificial-reality environment, the commands used for different users can be configured differently. For instance, a first user might prefer that a jump command is executed while the first pinch gesture is received while the wrist-wearable device 114 has the first roll value, but a different second user might prefer that a sprinting command is executed while the first pinch gesture is received while the wrist-wearable device 114 is worn by the different second user and the wrist-wearable device 114 has the first roll value. In some embodiments, the method 600 includes selecting (628) sensed-value thresholds that are specific to the user, the sensed-value thresholds used by the wrist-wearable device 114 for detecting one or both of (i) the digit-to-digit gesture and (ii) the first and second roll values for different users of the wrist-wearable device 114. Additional examples of the input commands and sensed-value threshold are provided above in reference to FIGS. 1A-5B.

In some embodiments, the first input command is selected (630) based on a device state of the target device. In some embodiments, the device state includes (632) information regarding an application that is executing on the target device when the indication is received. In some embodiments, while the target device is displaying (634) a first application, the first input command causes the target device to perform a first action (e.g., go to previous page in a web application); while the target device is displaying a second application, the first input command also causes the target device to perform the first action (e.g., go to previous page in a web application). In some embodiments, while the target device is displaying (636) a first application, the first input command causes the device to perform a first action (e.g., go to previous page in a web application); while the target device is displaying a second application, the first input command causes the device to perform a second action distinct from the first action (e.g., cause an avatar to jump in a gaming application).

In some embodiments, prior to receiving the indication at the first point in time that the user is providing the digit-to-digit gesture, the method 600 includes establishing (638) a communication channel with the target device, without requiring any input from the user. Establishing a communication channel without requiring any input from the user helps to establish an improved man-machine interface in which the user is able to provide fewer inputs to achieve the desired outcome of controlling the target device. In this example, the user provides no inputs in order to achieve that desired outcome, thereby offering a significant improvement in the man-machine interface and helping to ensure that users are able to maintain a sustained interaction with the wrist-wearable device 114 and also with the target device. In some embodiments, an ultra-wideband (UWB) antenna of the wrist-wearable device 114 is used (640) for establishing the communication channel. For example, the wrist-wearable device 114 has UWB antennas that are used to transmit data and localize antennas. As such, the UWB antennas are used to search for and pair with the target device and exchange authentication information. As an example, a user may be signed into a Facebook account on the target device, and the target device is already set up to authenticate. Following the pairing and/or authentication, Bluetooth is used for controlling the target device.

In some embodiments, in response to detecting that the wrist-wearable device 114 has moved closer to a second target device distinct from the target device, the method 600 includes establishing (642-*a*) a second communication channel with the second target device instead of the target device, without requiring any input from the user. In some embodiments, the method 600 further includes receiving (642-*b*) an additional indication at a third point in time that the user intends to perform the digit-to-digit gesture once again. In some embodiments, the method 600 also includes, in accordance with a determination that the gesture that is once again provided is provided while the one or more sensors indicate that the wrist-wearable device 114 has a third roll value, causing the second target device to perform a third input command, using the second communication channel.

Figure 7A:
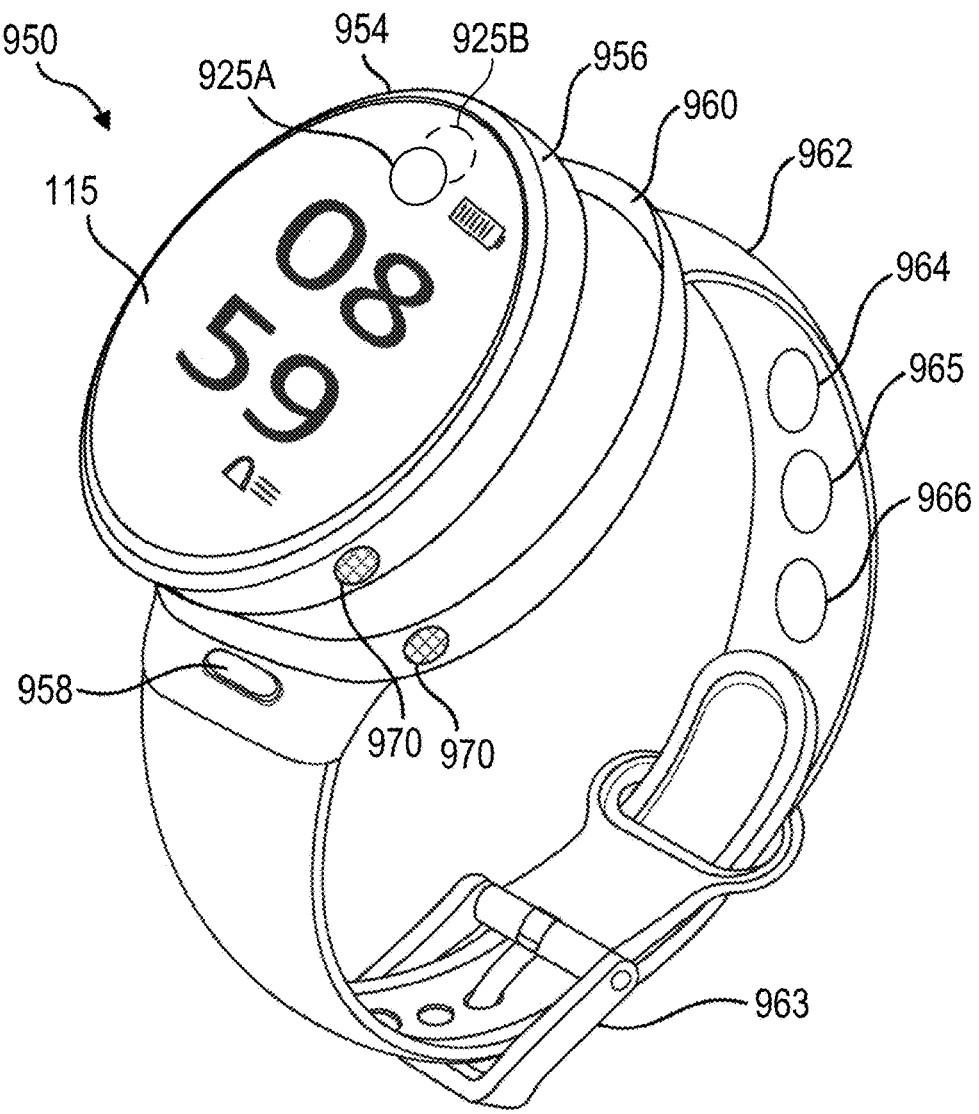
FIGS. 7A and 7B illustrate an example wrist-wearable device, in accordance with some embodiments.
Figure 7B:
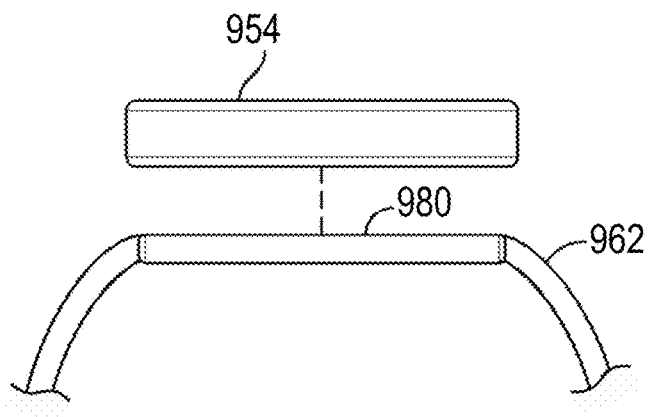

FIGS. 7A and 7B illustrate an example wrist-wearable device 950, in accordance with some embodiments. The wearable device 114 shown and described in reference to FIGS. 1A-5B can be an instance of the wrist-wearable device 950. FIG. 7A illustrates a perspective view of the wrist-wearable device 950 that includes a watch body 954 decoupled from a watch band 962. Watch body 954 and watch band 962 can have a substantially rectangular or circular shape and can be configured to allow a user to wear the wrist-wearable device 950 on a body part (e.g., a wrist). The wrist-wearable device 950 can include a retaining mechanism 963 (e.g., a buckle, a hook and loop fastener, etc.) for securing watch band 962 to the user's wrist. The wrist-wearable device 950 can also include a coupling mechanism 960 (e.g., a cradle) for detachably coupling watch body (or capsule) 954 (via a coupling surface 956 of the watch body 954) to watch band 962.

Functions executed by the wrist-wearable device 950 can include, without limitation, display of visual content to the user (e.g., visual content displayed on display 115), sensing user input (e.g., sensing a touch on button 958, sensing biometric data on sensor 964, sensing neuromuscular signals on neuromuscular sensor 965, etc.), messaging (e.g., text, speech, video, etc.), image capture, wireless communications (e.g., cellular, near field, WiFi, personal area network, etc.), location determination, financial transactions, providing haptic feedback, alarms, notifications, biometric authentication, health monitoring, sleep monitoring, etc. These functions can be executed independently in watch body 954, independently in watch band 962, and/or in communication between watch body 954 and watch band 962. The wrist-wearable device 950 can further perform any functions described above in reference to FIGS. 1A-6D. In some embodiments, functions can be executed on the wrist-wearable device 950 in conjunction with an artificial-reality environment which includes, but is not limited to, virtual-reality (VR) environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 962 can be configured to be worn by a user such that an inner surface of the watch band 962 is in contact with the user's skin. When worn by a user, sensor 964 is in contact with the user's skin. The sensor 964 can be a biosensor that senses a user's heart rate, saturated oxygen level, temperature, sweat level, muscle intentions, or a combination thereof (any of these can be examples of the biometric sensor described above and used in conjunction with the positional-state determinations described herein, and can also be associated with the capsule portion instead of the band portion). The watch band 962 can include multiple sensors 964 that can be distributed on an inside and/or an outside surface of the watch band 962. Additionally, or alternatively, the watch body 954 can include the same or different sensors than the watch band 962 (or the watch band 962 can include no sensors at all in some embodiments). For example, multiple sensors can be distributed on an inside and/or an outside surface of watch body 954. The watch body 954 (e.g., a capsule portion) can include, without limitation, a magnetic field sensor, antenna return-loss sensor, front-facing image sensor 925A and/or rear-facing image sensor 925B, a biometric sensor (e.g., biometric sensor), an IMU sensor 1042, a heart rate sensor, a saturated oxygen sensor, a neuromuscular sensor(s), an altimeter sensor, a temperature sensor, a bio-impedance sensor, a pedometer sensor, an optical sensor, a touch sensor (e.g., capacitive sensor 1089 shown in FIG. 8), a sweat sensor, etc. The sensor 964 can also include a sensor that provides data about a user's environment, including a user's motion (e.g., an IMU sensor 1042), altitude, location, orientation, gait, or a combination thereof. The sensor 964 can also include a light sensor (e.g., an infrared light sensor, a visible light sensor) that is configured to track a position and/or motion of watch body 954 and/or watch band 962. Watch band 962 can transmit the data acquired by the sensor 964 to watch body 954 using a wired communication method (e.g., a universal asynchronous receiver/transmitter (UART), a universal serial bus (USB) transceiver, etc.) and/or a wireless communication method (e.g., near field communication, Bluetooth™, etc.). Watch band 962 can be configured to operate (e.g., to collect data using sensor 964) independent of whether watch body 954 is coupled to or decoupled from watch band 962.

The watch band 962 and/or watch body 954 can include a haptic device 966 (e.g., a vibratory haptic actuator) that is configured to provide haptic feedback (e.g., a cutaneous and/or kinesthetic sensation, etc.) to the user's skin. The sensor 964 and/or haptic device 966 can be configured to operate in conjunction with multiple applications including, without limitation, health monitoring, social media, game playing, and artificial reality (e.g., the applications associated with artificial reality).

In some examples, the watch band 962 can include a neuromuscular sensor 965 (e.g., an Electromyography (EMG) sensor, a mechanomyogram sensor, a sonomyography sensor, etc.). Neuromuscular sensor 965 can sense a user's intention to perform certain motor actions (this neuromuscular sensor 965 can be another example of a sensor used as the biometric sensor in conjunction with the positional-state determinations described herein). The sensed muscle intention can be used to control certain user interfaces displayed on the display 115 of the wrist-wearable device 950 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 965 can be used to provide a user with an enhanced interaction with a physical object and/or a virtual object in an artificial-reality application generated by an artificial-reality system (e.g., user interface objects presented on the display 115, or another computing device 650 (e.g., a head-mounted display)). Signals from neuromuscular sensor 965 can be obtained (e.g., sensed and recorded) by one or more neuromuscular sensors 965 of watch band 962. Although FIG. 7A shows one neuromuscular sensor 965, watch band 962 can include a plurality of neuromuscular sensors 965 arranged circumferentially on an inside surface of watch band 962 such that the plurality of neuromuscular sensors 965 contact the skin of the user. Watch band 962 can include a plurality of neuromuscular sensors 965 arranged circumferentially on an inside surface of watch band 962. Neuromuscular sensor 965 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The wrist-wearable device 950 can include a coupling mechanism (also referred to as a cradle) for detachably coupling watch body 954 to watch band 962. A user can detach watch body 954 from watch band 962 in order to reduce the encumbrance of the wrist-wearable device 950 to the user. The wrist-wearable device 950 can include a coupling surface 956 on the watch body 954 and/or watch band coupling mechanism(s) 960 (e.g., a cradle, a tracker band, a support base or a clasp). A user can perform any type of motion to couple watch body 954 to watch band 962 and to decouple watch body 954 from watch band 962. For example, a user can twist, slide, turn, push, pull, or rotate watch body 954 relative to watch band 962, or a combination thereof, to attach watch body 954 to watch band 962 and to detach watch body 954 from watch band 962.

As shown in the example of FIG. 7A, watch band coupling mechanism 960 can include a type of frame or shell that allows watch body 954 coupling surface 956 to be retained within watch band coupling mechanism 960. Watch body 954 can be detachably coupled to watch band 962 through a friction fit, magnetic coupling, a rotation-based connector, a shear-pin coupler, a retention spring, one or more magnets, a clip, a pin shaft, a hook and loop fastener, or a combination thereof. In some examples, watch body 954 can be decoupled from watch band 962 by actuation of release mechanism 970. The release mechanism 970 can include, without limitation, a button, a knob, a plunger, a handle, a lever, a fastener, a clasp, a dial, a latch, or a combination thereof.

The wrist-wearable device 950 can include a single release mechanism 970 or multiple release mechanisms 970 (e.g., two release mechanisms 970 positioned on opposing sides of the wrist-wearable device 950, such as spring-loaded buttons). As shown in FIG. 7A, the release mechanism 970 can be positioned on watch body 954 and/or watch band coupling mechanism 960. Although FIG. 7A shows release mechanism 970 positioned at a corner of watch body 954 and at a corner of watch band coupling mechanism 960, the release mechanism 970 can be positioned anywhere on watch body 954 and/or watch band coupling mechanism 960 that is convenient for a user of wrist-wearable device 950 to actuate. A user of the wrist-wearable device 950 can actuate the release mechanism 970 by pushing, turning, lifting, depressing, shifting, or performing other actions on the release mechanism 970. Actuation of the release mechanism 970 can release (e.g., decouple) the watch body 954 from the watch band coupling mechanism 960 and the watch band 962 allowing the user to use the watch body 954 independently from watch band 962. For example, decoupling the watch body 954 from the watch band 962 can allow the user to capture images using rear-facing image sensor 925B.

FIG. 7B is a side view of the wrist-wearable device 950. The wrist-wearable device 950 of FIG. 7B can include a watch body interface 980 (another example of a cradle for the capsule portion of the wrist-wearable device 114). The watch body 954 can be detachably coupled to the watch body interface 980. Watch body 954 can be detachably coupled to watch body interface 980 through a friction fit, magnetic coupling, a rotation-based connector, a shear-pin coupler, a retention spring, one or more magnets, a clip, a pin shaft, a hook and loop fastener, or a combination thereof.

In some examples, watch body 954 can be decoupled from watch body interface 980 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 954, independently in watch body interface 980, and/or in communication between watch body 954 and watch body interface 980. Watch body interface 980 can be configured to operate independently (e.g., execute functions independently) from watch body 954. Additionally, or alternatively, watch body 954 can be configured to operate independently (e.g., execute functions independently) from watch body interface 980. Watch body interface 980 and/or watch body 954 can each include the independent resources required to independently execute functions. For example, watch body interface 980 and/or watch body 954 can each include a power source (e.g., a battery), a memory, data storage, a processor (e.g., a CPU), communications, a light source, and/or input/output devices.

In this example, watch body interface 980 can include all of the electronic components of watch band 962. In additional examples, one or more electronic components can be housed in watch body interface 980 and one or more other electronic components can be housed in portions of watch band 962 away from watch body interface 980.

FIG. 8 is a block diagram of a wrist-wearable device system 1000, according to at least one embodiment of the present disclosure. The wearable device 114 described in detail above is an example wrist-wearable device system 1000, so wearable device 114 will be understood to include the components shown and described for wrist-wearable device system 1000 below. The wrist-wearable device system 1000 can have a split architecture (e.g., a split mechanical architecture or a split electrical architecture) between a watch body 1004 (e.g., a capsule 954) and a watch band 1012 (e.g., a band portion 962/band portion 108), which was described above in reference to FIGS. 7A and 7B. Each of watch body 1004 and watch band 1012 can have a power source, a processor, a memory, sensors, a charging device, and a communications device that enables each of watch body 1004 and watch band 1012 to execute computing, controlling, communication, and sensing functions independently in watch body 1004, independently in watch band 1012, and/or in communication between watch body 1004 and watch band 1012.

For example, watch body 1004 can include capacitive sensor 1089, magnetic field sensor 1095, antenna return-loss (RL) sensor 124, biometric sensor 126, battery 1028, CPU 1026, storage 1002, heart rate sensor 1058, EMG sensor 1046, SpO2 sensor 1054, altimeter 1048, IMU sensor 1042, random access memory 1003, charging input 1030 and communication devices NFC 1015, LTE 1018, and WiFi/Bluetooth™ 1020. Similarly, watch band 1012 can include battery 1038, microcontroller unit 1052, memory 1050, heart rate sensor 1058, EMG sensor 1046, SpO2 sensor 1054, altimeter 1048, IMU sensor 1042, charging input 1034 and wireless transceiver 1040. Memory 1050 (and/or storage 1002) may further include device state table 1091, an example of which is shown in FIG. 1C. In some examples, a level of functionality of at least one of watch band 1012 or watch body 1004 can be modified when watch body 1004 is detached from watch band 1012. The level of functionality that can be modified can include the functionality of at least one sensor (e.g., heart rate sensor 1058, EMG sensor 1046, etc.). Each of watch body 1004 and watch band 1012 can execute instructions stored in storage 1002 and memory 1050 respectively that enables at least one sensor (e.g., heart rate sensor 1058, EMG sensor 1046, etc.) in watch band 1012 to acquire data when watch band 1012 is detached from watch body 1004 and when watch band 1012 is attached to watch body 1004.

Watch body 1004 and watch band 1012 can further execute instructions stored in storage 1002 and memory 1050, respectively, which enables watch band 1012 to transmit the acquired data to watch body 1004 (or other computing device such as a head mounted display or other computing device 350; FIG. 3) using wired communications 1027 and/or wireless transceiver 1040. For example, watch body 1004 can display visual content to a user on touchscreen display 1013 (e.g., an instance of display 115) and play audio content on speaker 125. Watch body 1004 can receive user inputs such as audio input from microphone 127 and touch input from buttons 1024. Watch body 1004 can also receive inputs associated with a user's location and/or surroundings. For example, watch body 1004 can receive location information from GPS 1016 and/or altimeter 1048 of watch band 1012.

Watch body 1004 can receive image data from at least one image sensor 135 (e.g., a camera). Image sensor 135 can include front-facing image sensor 925A (FIG. 7A) and/or rear-facing image sensor 925B (FIG. 7B). Front-facing image sensor 925A and/or rear-facing image sensor 925B can capture wide-angle images of the area surrounding front-facing image sensor 925A and/or rear-facing image sensor 925B such as hemispherical images (e.g., at least hemispherical, substantially spherical, etc.), 180-degree images, 360-degree area images, panoramic images, ultra-wide area images, or a combination thereof. In some examples, front-facing image sensor 925A and/or rear-facing image sensor 925B can be configured to capture images having a range between 45 degrees and 360 degrees. Certain input information received by watch body 1004 (e.g., user inputs, etc.) can be communicated to watch band 1012. Similarly, certain input information (e.g., acquired sensor data, neuromuscular sensor data, etc.) received by watch band 1012 can be communicated to watch body 1004.

Watch body 1004 and watch band 1012 can receive a charge using a variety of techniques. In some embodiments, watch body 1004 and watch band 1012 can use a wired charging assembly (e.g., power cords) to receive the charge. Alternatively, or in addition, watch body 1004 and/or watch band 1012 can be configured for wireless charging. For example, a portable charging device can be designed to mate with a portion of watch body 1004 and/or watch band 1012 and wirelessly deliver usable power to a battery of watch body 1004 and/or watch band 1012.

Watch body 1004 and watch band 1012 can have independent power and charging sources to enable each to operate independently. Watch body 1004 and watch band 1012 can also share power (e.g., one can charge the other) via power management IC 1032 in watch body 1004 and power management IC 1036 in watch band 1012. Power management IC 1032 and power management IC 1036 can share power over power and ground conductors and/or over wireless charging antennas.

Wrist-wearable device system 1000 can operate in conjunction with a health-monitoring application that acquires biometric and activity information associated with the user. The health-monitoring application can be designed to provide information to a user that is related to the user's health. For example, wrist-wearable device system 1000 can monitor a user's physical activity by acquiring data from IMU sensor 1042 while simultaneously monitoring the user's heart rate via heart rate sensor 1058 and saturated blood oxygen levels via SpO2 sensor 1054. CPU 1026 can process the acquired data and display health related information to the user on touchscreen display 1013.

Wrist-wearable device system 1000 can detect when watch body 1004 and watch band 1012 are connected to one another (e.g., mechanically connected and/or electrically or magnetically connected) or detached from one another. For example, pin(s), power/ground connections 1060, wireless transceiver 1040, and/or wired communications 1027, can detect whether watch body 1004 and watch band 1012 are mechanically and/or electrically or magnetically connected to one another (e.g., detecting a disconnect between the one or more electrical contacts of power/ground connections 1060 and/or wired communications 1027). In some examples, when watch body 1004 and watch band 1012 are mechanically and/or electrically disconnected from one another (e.g., watch body 1012 has been detached from watch band 1012 as described with reference to FIGS. 7A and 7B), watch body 1004 and/or watch band 1012 can operate with modified level of functionality (e.g., reduced functionality) as compared to when watch body 1004 and watch band 1012 are mechanically and/or electrically connected to one another. The modified level of functionality (e.g., switching from full functionality to reduced functionality and from reduced functionality to full functionality) can occur automatically (e.g., without user intervention) when wrist-wearable device system 1000 determines that watch body 1004 and watch band 1012 are mechanically and/or electrically disconnected from one another and connected to each other, respectively.

Modifying the level of functionality (e.g., reducing the functionality in watch body 1004 and/or watch band 1012) can reduce power consumption in battery 1028 and/or battery 1038. For example, any of the sensors (e.g., heart rate sensor 1058, EMG sensor 1046, SpO2 sensor 1054, altimeter 1048, etc.), processors (e.g., CPU 1026, microcontroller unit 1052, etc.), communications elements (e.g., communication devices NFC 1015, GPS 1016, LTE 1018, WiFi/Bluetooth™ 1020, antennas 1093, etc.), or actuators (e.g., haptics 1022, 1049, etc.) can reduce functionality and/or power consumption (e.g., enter a sleep mode) when watch body 1004 and watch band 1012 are mechanically and/or electrically disconnected from one another. Watch body 1004 and watch band 1012 can return to full functionality when watch body 1004 and watch band 1012 are mechanically and/or electrically connected to one another. The level of functionality of each of the sensors, processors, actuators, and memory can be independently controlled.

As described above, wrist-wearable device system 1000 can detect when watch body 1004 and watch band 1012 are coupled to one another (e.g., mechanically connected and/or electrically connected) or decoupled from one another. In some examples, watch body 1004 can modify a level of functionality (e.g., activate and/or deactivate certain functions) based on whether watch body 1004 is coupled to watch band 1012. For example, CPU 1026 can execute instructions that detect when watch body 1004 and watch band 1012 are coupled to one another and activate front-facing image sensor 925A. CPU 1026 can activate front-facing image sensor 925A based on receiving user input (e.g., a user touch input from touchscreen display 1013, a user voice command from microphone 127, a user gesture recognition input from EMG sensor 1046, etc.).

When CPU 1026 detects that watch body 1004 and watch band 1012 are decoupled from one another, CPU 1026 can modify a level of functionality (e.g., activate and/or deactivate additional functions). For example, CPU 1026 can detect when watch body 1004 and watch band 1012 are decoupled from one another and activate rear-facing image sensor 925B. CPU 1026 can activate rear-facing image sensor 925B automatically (e.g., without user input) and/or based on receiving user input (e.g., a touch input, a voice input, an intention detection, etc.). Automatically activating rear-facing image sensor 925B can allow a user to take wide-angle images without having to provide user input to activate rear-facing image sensor 925B.

In some examples, rear-facing image can be activated based on an image capture criterion (e.g., an image quality, an image resolution, etc.). For example, rear-facing image sensor 925B can receive an image (e.g., a test image). CPU 1026 and/or rear-facing image sensor 925B can analyze the received test image data and determine whether the test image data satisfies the image capture criterion (e.g., the image quality exceeds a threshold, the image resolution exceeds a threshold, etc.). Rear-facing image sensor 925B can be activated when the test image data satisfies the image capture criterion. Additionally, or alternatively, rear-facing image sensor 925B can be deactivated when the test image data fails to satisfy the image capture criterion.

In some examples, CPU 1026 can detect when watch body 1004 is coupled to watch band 1012 and deactivate rear-facing image sensor 925B. CPU 1026 can deactivate rear-facing image sensor 925B automatically (e.g., without user input) and/or based on receiving user input (e.g., a touch input, a voice input, an intention detection, etc.). Deactivating rear-facing image sensor 925B can automatically (e.g., without user input) reduce the power consumption of watch body 1004 and increase the battery charge time in watch body 1004. In some examples, wrist-wearable device system 1000 can include a coupling sensor 1007 that senses whether watch body 1004 is coupled to or decoupled from watch band 1012. Coupling sensor 1007 can be included in any of watch body 1004, watch band 1012, or watch band coupling mechanism 960 of FIGS. 7A and 7B. Coupling sensor 1007 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1026 can detect when watch body 1004 is coupled to watch band 1012 or decoupled from watch band 1012 by reading the status of coupling sensor 1007.

FIG. 9 shows an example technique for using data from an inertial measurement unit to detect digit-to-digit gestures. As illustrated in FIG. 9, at step 1102, a vibration sensor (e.g., IMU sensor 1042 shown in FIG. 8) incorporated into a wrist-wearable device (e.g., wrist-wearable device 114 shown in FIG. 1A) donned by a user of an artificial-reality system may detect a vibration that arrived at the wrist-wearable device 114 via a body (e.g., a skin surface and/or bone structure) of the user. For example, referring to FIG. 1A, the wrist of user 110 may experience vibration that arrived via the skin and/or bone of user 110. Since, in this example, user 110 is donning wrist-wearable device 114 around wrist, IMU sensor 1042 incorporated into wrist-wearable device 114 may measure, detect, and/or sense the acceleration caused by a vibration.

At step 1104 in FIG. 9, the vibration sensor may generate an electrical response that corresponds to the vibration that arrived at the wearable via the body of the user. For example, vibration sensor may measure vibration from various all degrees of freedom. In this example, vibration sensor may generate an electrical response that is commensurate with and/or representative of vibration.

At step 1106 in FIG. 9, a processing device may determine that the user has made a specific gesture with at least one body part based at least in part on the electrical response generated by the vibration sensor. For example, a processing device and/or a processing device incorporated into a head-mounted display of the artificial-reality system may determine that user 110 has made a specific gesture with their hand or fingers. In this example, processing device and/or the processing device incorporated into the wrist-wearable device 114 may reach this determination based at least in part on the electrical response generated by vibration sensor.

At step 1108 in FIG. 9, a processing device may generate an input command for the artificial-reality system based at least in part on the specific gesture made by the user. For example, a processing device and/or the processing device incorporated into the wrist-wearable device 114 may modify one or more graphics included in image frames presented to the user via the head-mounted display. Such modifications to those graphics may account for the specific gesture made by the user's hand and/or fingers.

The wrist-wearable device 114 may be able to detect certain gestures made by a user 110 of the artificial-reality system. For example, the wrist-wearable device 114 may constitute a wristband that includes a vibration sensor. When the user makes a certain gesture with their hand and/or fingers (e.g., tapping together their thumb and index finger), the vibration sensor may detect and/or sense a vibration resulting from that gesture. The vibration sensor may then generate an electrical response consistent with that vibration. The wrist-wearable device 114 may be able to identify which particular gesture was made by the user 110 by analyzing the electrical response generated by the vibration sensor. Upon identifying the particular gesture, the wrist-wearable device 114 may cause the artificial-reality system to modify the user's artificial reality experience to account for that gesture. FIG. 9 is an example of how IMU sensor data can be used to detect digit-to-digit gestures.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widgets, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A non-transitory, computer-readable storage medium including instructions that, when executed by a wrist-wearable device including a display and one or more sensors configured to detect yaw, pitch, and roll values for the wrist-wearable device, cause the wrist-wearable device to:
receive a first indication at a first point in time that a user donning the wrist-wearable device is providing a first digit-to-digit gesture in which a first user digit touches a second user digit without contacting the display of the wrist-wearable device;
in accordance with a determination that the first digit-to-digit gesture is provided while data from the one or more sensors indicates that the wrist-wearable device has a first roll value, cause a target device that is in communication with the wrist-wearable device to perform a first input command;
receive a second indication at a second point in time that is after the first point in time that the user is providing the first digit-to-digit gesture again; and
in accordance with a determination that the first digit-to-digit gesture is provided again while data from the one or more sensors indicates that the wrist-wearable device has a second roll value that is distinct from the first roll value, cause the target device to perform a second input command that is distinct from the first input command;
receive a third indication at a third point in time that is after the first point in time that the user is providing a second digit-to-digit gesture in which a third user digit touches a fourth user digit without contacting the display of the wrist-wearable device, wherein the third user digit or the fourth user digit is distinct from the first user digit and the second user digit;
in accordance with a determination that the second digit-to-digit gesture is provided while the data from the one or more sensors indicates that the wrist-wearable device has the first roll value, cause the target device that is in communication with the wrist-wearable device to perform a third input command distinct from the first input command;
receive a fourth indication at a fourth point in time that is after the first point in time that the user is providing the second digit-to-digit gesture; and
in accordance with a determination that the second digit-to-digit gesture is provided while the data from the one or more sensors indicates that the wrist-wearable device has the second roll value that is distinct from the first roll value, cause the target device to perform a fourth input command that is distinct from the first input command.

2. The non-transitory, computer-readable storage medium of claim 1, wherein the first indication received at the first point in time and the second indication received at the second point in time are both detected based on neuromuscular signals sensed by Electromyography (EMG) sensors of the one or more sensors of the wrist-wearable device.

3. The non-transitory, computer-readable storage medium of claim 1, wherein the first indication received at the first point in time and the second indication received at the second point in time are both detected based on vibration signals sensed by Inertial Measurement Units (IMUs) of the one or more sensors of the wrist-wearable device.

4. The non-transitory, computer-readable storage medium of claim 1, wherein the target device is separate and distinct from the wrist-wearable device or the target device is the wrist-wearable device.

5. The non-transitory, computer-readable storage medium of claim 1, wherein the instructions that, when executed by the wrist-wearable device, further cause the wrist-wearable device to:
prior to receiving the first indication at the first point in time that the user is providing the first digit-to-digit gesture, establish a communication channel with the target device, without requiring any input from the user.

6. The non-transitory, computer-readable storage medium of claim 5, wherein an ultra-wideband (UWB) antenna of the wrist-wearable device is used for establishing the communication channel.

7. The non-transitory, computer-readable storage medium of claim 5, wherein the instructions that, when executed by the wrist-wearable device, further cause the wrist-wearable device to:
in response to detecting that the wrist-wearable device has moved closer to a second target device than to the target device:
establish a second communication channel with the second target device instead of the target device, without requiring any input from the user;
receive a fifth indication at a fifth point in time that the user intends to perform the first or second digit-to-digit gesture once again; and
in accordance with a determination that the first or second digit-to-digit gesture that is once again provided is provided while the one or more sensors indicate that the wrist-wearable device has a third roll value, cause the second target device to perform a fifth input command, using the second communication channel.

8. The non-transitory, computer-readable storage medium of claim 1, wherein the instructions that, when executed by the wrist-wearable device, further cause the wrist-wearable device to:
control a user interface on the display of the wrist-wearable device based on additional sensor data from Inertial Measurement Units (IMUs) of the one or more sensors of the wrist-wearable device.

9. The non-transitory, computer-readable storage medium of claim 8, wherein controlling the user interface on the display of the wrist-wearable device comprises changing zoom levels on a map based on yaw values of the wrist-wearable device.

10. The non-transitory, computer-readable storage medium of claim 1, wherein each of the first input command and the second input command controls video playback at the target device.

11. The non-transitory, computer-readable storage medium of claim 1, wherein each of the first input command and the second input command controls navigation through photos displayed at the target device.

12. The non-transitory, computer-readable storage medium of claim 1, wherein each of the first input command and the second input command controls a gaming interface displayed at the target device.

13. The non-transitory, computer-readable storage medium of claim 1, wherein the instructions that, when executed by the wrist-wearable device, further cause the wrist-wearable device to:
select different input commands as the first and second input commands based on whether biometric data sensed at the wrist-wearable device indicates that the user is a first user or a second user.

14. The non-transitory, computer-readable storage medium of claim 1, wherein the instructions that, when executed by the wrist-wearable device, further cause the wrist-wearable device to:
select sensed-value thresholds that are specific to the user, the sensed-value thresholds used by the wrist-wearable device for detecting one or both of (i) the first or second digit-to-digit gesture and (ii) the first and second roll values for different users of the wrist-wearable device.

15. The non-transitory, computer-readable storage medium of claim 1, wherein the first input command is selected based on a device state of the target device.

16. The non-transitory, computer-readable storage medium of claim 15, wherein the device state includes information regarding an application that is executing on the target device when the first or the second indication is received.

17. The non-transitory, computer-readable storage medium of claim 15, wherein:
while the target device is displaying a first application, the first input command causes the target device to perform a first action; and
while the target device is displaying a second application, the first input command also causes the target device to perform the first action.

18. The non-transitory, computer-readable storage medium of claim 15, wherein:
while the target device is displaying a first application, the first input command causes the device to perform a first action; and
while the target device is displaying a second application, the first input command causes the device to perform a second action distinct from the first action.

19. A method of interpreting a digit-to-digit gesture based on roll values for a wrist-wearable device, wherein the wrist-wearable device includes a display and one or more sensors configured to detect yaw, pitch, and roll values for the wrist-wearable device, the method comprising:
receiving a first indication at a first point in time that a user donning the wrist-wearable device is providing a first digit-to-digit gesture in which a first user digit touches a second user digit without contacting the display of the wrist-wearable device;
in accordance with a determination that the first digit-to-digit gesture is provided while data from the one or more sensors indicates that the wrist-wearable device has a first roll value, causing a target device that is in communication with the wrist-wearable device to perform a first input command;
receiving a second indication at a second point in time that is after the first point in time that the user is providing the first digit-to-digit gesture again; and
in accordance with a determination that the first digit-to-digit gesture is provided again while data from the one or more sensors indicates that the wrist-wearable device has a second roll value that is distinct from the first roll value, causing the target device to perform a second input command that is distinct from the first input command
receiving a third indication at a third point in time that is after the first point in time that the user is providing a second digit-to-digit gesture in which a third user digit touches a fourth user digit without contacting the display of the wrist-wearable device, wherein the third user digit or the fourth user digit is distinct from the first user digit and the second user digit;
in accordance with a determination that the second digit-to-digit gesture is provided while the data from the one or more sensors indicates that the wrist-wearable device has the first roll value, causing the target device that is in communication with the wrist-wearable device to perform a third input command distinct from the first input command and the second input command;
receiving a fourth indication at a fourth point in time that is after the first point in time that the user is providing the second digit-to-digit gesture again; and
in accordance with a determination that the second digit-to-digit gesture is provided again while the data from the one or more sensors indicates that the wrist-wearable device has the second roll value that is distinct from the first roll value, causing the target device to perform a fourth input command that is distinct from the first input command.

* * * * *